US010482045B2

(12) United States Patent
Ahamed et al.

(10) Patent No.: US 10,482,045 B2
(45) Date of Patent: Nov. 19, 2019

(54) DATA COMMUNICATION INTERFACE FOR PROCESSING DATA IN LOW POWER SYSTEMS

(71) Applicant: ANALOG DEVICES GLOBAL UNLIMITED COMPANY, Hamilton (BM)

(72) Inventors: Mohamed Farook Basheer Ahamed, Bangalore (IN); Michael Martin McCarthy, Co. Limerick (IE); Aravind K. Navada, Bangalore (IN)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 514 days.

(21) Appl. No.: 15/187,763

(22) Filed: Jun. 20, 2016

(65) Prior Publication Data
US 2017/0235692 A1    Aug. 17, 2017

Related U.S. Application Data

(60) Provisional application No. 62/296,512, filed on Feb. 17, 2016.

(51) Int. Cl.
G06F 13/32    (2006.01)
G06F 13/42    (2006.01)
(Continued)

(52) U.S. Cl.
CPC .............. *G06F 13/32* (2013.01); *G06F 1/325* (2013.01); *G06F 1/3215* (2013.01);
(Continued)

(58) Field of Classification Search
None
See application file for complete search history.

(56) References Cited

U.S. PATENT DOCUMENTS 6,799,030 B2    9/2004  Barber et al.
8,886,981 B1   11/2014  Baumann et al.
(Continued)

FOREIGN PATENT DOCUMENTS

CN    103714029    4/2014

OTHER PUBLICATIONS

*Blackfin Dual Core Embedded Processor,* ADSP-BF606/ADSP-BF607/ADSP-BR608/ADSP-BF609, © 2014 Analog Devices, Inc., 112 pages.
(Continued)

*Primary Examiner* — Idriss N Alrobaye
*Assistant Examiner* — Dayton Lewis-Taylor
(74) *Attorney, Agent, or Firm* — Patent Capital Group

(57) ABSTRACT

Improvements over existing data collection interfaces disclosed herein include, among other things, additional logic blocks (and associated timers, state machines, and registers) to off-load data collection and data processing prior to waking a microprocessor from a sleep mode. For example, an improved data collection interface collects a predetermined number of sensor values from a sensor while maintaining active a single communication session with the sensor over a pin of the interface. The microprocessor remains in the sleep mode for an entire duration of the single communication session. The data collection interface can reduce the likelihood of false starts of the microprocessor by using the logic blocks to verify that data meet preconditions prior to interrupting the microprocessor. The data collection interface can reduce the overall power consumption of a chip in which the microprocessor is integrated by a factor of at least about 2× (i.e., 50% reduction in power consumption).

20 Claims, 9 Drawing Sheets

(51) Int. Cl.
    *G06F 9/30*         (2018.01)
    *G06F 1/32*         (2019.01)
    *G06F 1/3234*      (2019.01)
    *G06F 1/3215*      (2019.01)
    *G06F 1/3287*      (2019.01)
    *H04Q 9/00*        (2006.01)

(52) U.S. Cl.
    CPC .......... *G06F 1/3243* (2013.01); *G06F 1/3287* (2013.01); *G06F 9/3005* (2013.01); *G06F 13/4282* (2013.01); *H04Q 9/00* (2013.01); *H04Q 2209/30* (2013.01); *H04Q 2209/75* (2013.01); *Y02D 10/14* (2018.01); *Y02D 10/151* (2018.01)

(56) References Cited

U.S. PATENT DOCUMENTS

| | | |
|---|---|---|
| 8,914,551 B2 | 12/2014 | Mortensen et al. |
| 2010/0008275 A1 | 1/2010 | Lee et al. |
| 2010/0322125 A1 | 12/2010 | Lee et al. |
| 2015/0378959 A1* | 12/2015 | Jones .................. G06F 13/4291 714/5.11 |

OTHER PUBLICATIONS

*Serial Peripheral Interface (SPI)*, Sparkfun, https://www.sparkfun.com/users/134919,, Jan. 14, 2013 6 pages.

Office Action issued in CN Patent Application No. 201710087706.X dated Jun. 11, 2019.

English Translation (Description, Claims, Abstract) of Foreign Reference CN103714029 [see 1 above].

\* cited by examiner

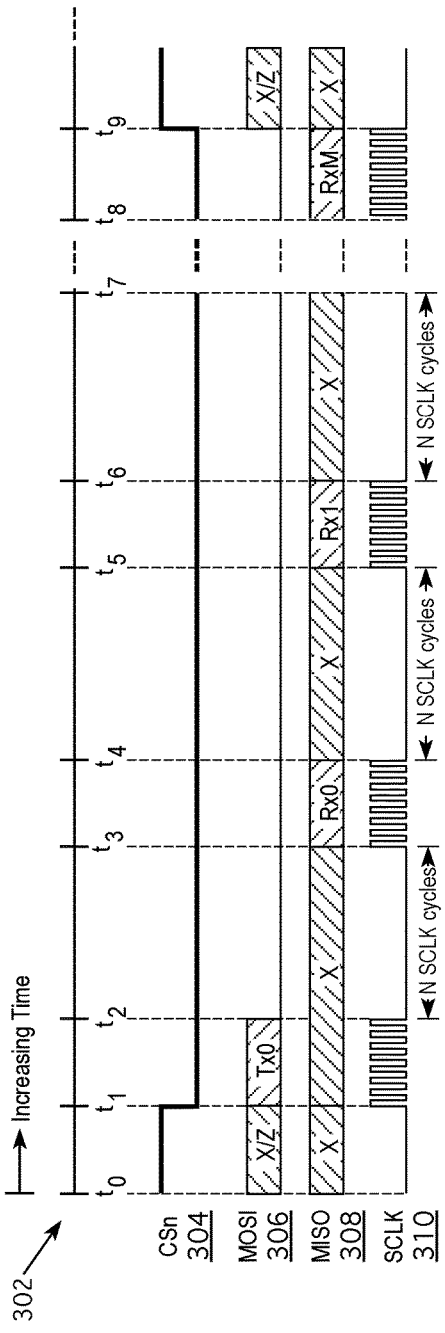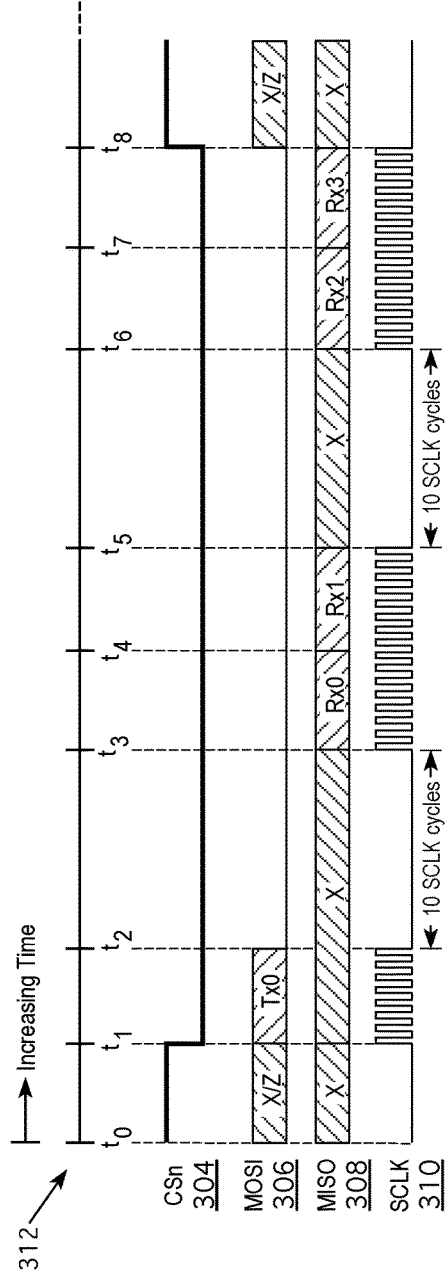

DATA COMMUNICATION INTERFACE FOR PROCESSING DATA IN LOW POWER SYSTEMS

CROSS-REFERENCE TO RELATED APPLICATIONS

This application claims the benefit of priority under 35 U.S.C. § 119(e) to U.S. Provisional Patent Application Ser. No. 62/296,512, entitled "DATA COMMUNICATION INTERFACE FOR PROCESSING DATA IN LOW POWER SYSTEMS" filed Feb. 17, 2016, which is hereby incorporated by reference in its entirety.

TECHNICAL FIELD OF THE DISCLOSURE

The present disclosure relates generally to a data communication and, more particularly, to data communication interfaces for retrieving and processing data from peripheral devices to reduce computational resources used by an associated microprocessor.

BACKGROUND

Modern sensor-based applications may include sensors managed by a microprocessor. The microprocessor may reside on a chip with other components, memory, blocks, and interfaces. The sensors are often connected to the microprocessor on the chip by a data communication interface (e.g., a serial peripheral interface (SPI) or an Inter-Integrated Circuit (IIC)). The data communication interface facilitates transferring sensor data from the sensors to the microcontroller. Such data may include a single sample or a series of samples and may be collected in a memory on the chip. In some cases, the microprocessor remains in an inactive state (e.g., asleep or consuming little or no power) while each sample is read from the sensor. Once the sample is collected, the processor is brought to an active state (e.g., awakened) by an interrupt request that prompt the microprocessor to, e.g., store the sample in memory. In some systems, a primary function of the microprocessor is to execute an algorithm on a collection of samples from the sensors. Thus, the microprocessor may frequently switch from the active to the inactive state during collection of a number of samples required before executing such an algorithm.

SUMMARY OF THE DISCLOSURE

In certain embodiments a data communication interface, for transferring data between a microprocessor and one or more sensors, is provided that discloses: a flow control logic block operable to, upon detection of a trigger condition, receive a predetermined number of sensor values from a selected sensor of the one or more sensors while maintaining active a single communication session with the selected sensor over the at least one pin, wherein the microprocessor is in an inactive state for an entire duration of the single communication session.

In further embodiments a data communication interface, for transferring data between a microprocessor and one or more sensors, is provided that discloses: one or more data processing logic blocks operable to receive sensor values read from the one or more sensors and to execute a pre-conditioning function on the sensor values to prepare the sensor values for further processing by an algorithm to be executed by the microprocessor.

In further embodiments a data communication interface, for transferring data between a microprocessor and one or more sensors, is provided that discloses: at least one pin operably coupled to the microprocessor and the one or more sensors; a sensor register storing a value identifying which of the one or more sensors is a selected sensor for communication over the at least one pin; a flow control logic block configured to generate an instruction to generate a read command based on the sensor register and detection of a trigger condition, wherein the flow control logic block is operable to, upon detection of the trigger condition, transmit the instruction to a state machine; the state machine configured to generate the read command based on the instruction, transmit the read command to the selected sensor, and receive a predetermined number of sensor values from the selected sensor while maintaining active a single communication session with the selected sensor over the at least one pin.

In further embodiments a system is provided that discloses: a microprocessor; one or more sensors; and a data communication interface comprising: at least one pin operably coupled to the microprocessor and the one or more sensors; a sensor register storing a value identifying which of the one or more sensors is a selected sensor for communication over the at least one pin; and a flow control logic block configured to generate an instruction to generate a read command based on the sensor register and detection of a trigger condition, wherein the flow control logic block is operable to, upon detection of the trigger condition, transmit the instruction to a state machine; the state machine configured to generate the read command based on the instruction, transmit the read command to the selected sensor, and receive a predetermined number of sensor values from the selected sensor while maintaining active a single communication session with the selected sensor over the at least one pin.

In further embodiments a method, for transferring data between a microprocessor and one or more sensors, is provided that discloses: retrieving, from a sensor register, a value identifying which of the one or more sensors is a selected sensor for communication over at least one pin, the at least one pin being operably coupled to the microprocessor and the one or more sensors; generating a read command based on the sensor register and detection of a trigger condition; upon detection of the trigger condition, transmitting the read command to the selected sensor; and receiving, from the selected sensor, a predetermined number of sensor values, wherein the predetermined number of sensor values is received while maintaining active a single communication session with the selected sensor over the at least one pin.

BRIEF DESCRIPTION OF THE DRAWINGS

The present disclosure is best understood from the following detailed description and the accompanying Figures. It is emphasized that, in accordance with standard practice in the industry, various features are not drawn to scale and are used for illustration purposes only. In fact, the dimensions of the various features may be arbitrarily increased or reduced for clarity of discussion.

FIGS. 3A-C illustrate signals sent on each pin of a four-pin data communication interface according to some embodiments of the present disclosure;

DETAILED DESCRIPTION OF EXAMPLE EMBODIMENTS

Figure 1:
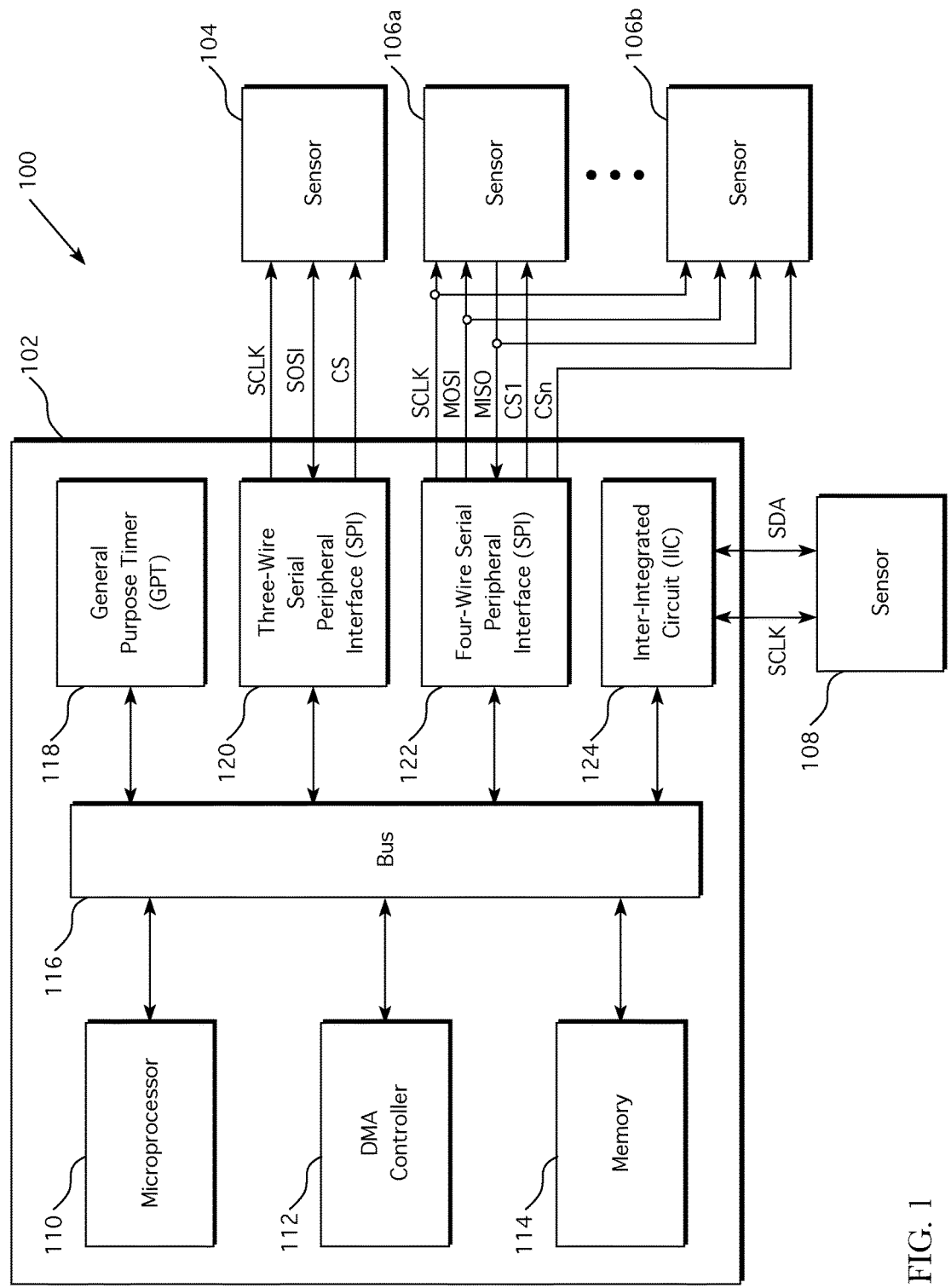
FIG. 1 is a block diagram illustrating a system for processing data received from peripheral devices.

In some low power systems, though a microprocessor has a relatively passive role in transferring data from peripheral devices, the microprocessor may consume a considerable amount of power. In such systems, the microprocessor may initiate a data transfer from a peripheral device and then enter into a sleep mode until the data transfer is complete. A 'sleep mode' of a microprocessor, as used in the present disclosure, is inclusive of the microprocessor being in a substantially inactive state. For example, the sleep mode may be characterized by the microprocessor suspending data processing and, as a result, consuming little or no power. As another example of the sleep mode, a timer—utilized by the microprocessor to execute operations—may be suspended and, as a result, the microprocessor remains "frozen" in a current state and performs no operations. The microprocessor can trigger a data collection interface to retrieve data from a connected peripheral device before entering the sleep mode. As an example, a processor in a smartphone may retrieve acceleration data (i.e., the data) from an accelerometer sensor (i.e., the peripheral device) to which it is connected by serial interface. In response to the trigger, the serial interface gets the data from the peripheral device and stores the data in a register. During the data transfer, a general-purpose timer (GPT) is active and is utilized to time the data transfer. After storing the data, the serial interface interrupts the microprocessor. In response to the interrupt, the microprocessor gets the data from the register and the places the data in a main memory of a chip on which the microprocessor resides. Peripheral devices, such as sensors, generate raw data at particular sample rate (e.g., measured in data samples per second). The microprocessor can then return to the sleep mode for a period of time (e.g., based on the sample rate of the peripheral device) and, after the period expires, it wakes again and repeats the above process. The microprocessor can also initiate burst transfers by switching between timing by the GPT (in which the GPT generates a trigger that initiates each transfer by the microprocessor) and a Serial Peripheral Interface (SPI) (in which the SPI generates an interrupt that initiates each transfer by the microprocessor). The microprocessor executes different interrupt service routines (ISRs) for each of the GPT and the SPI to enable it to respond to interrupts from the GPT and the SPI (i.e., the microprocessor executes two sets of ISRs: one set of ISRs for the GPT and another set of ISRs for the SPI). The above data transfer process is the same regardless of whether each fetch (by the serial interface) collects a single data value or multiple data values (i.e., burst transfer). A key difference is that the microprocessor can sleep longer during burst transfers that it can for single data values. The amount of power consumed by the chip (or board) in which the microprocessor is integrated increases considerably whenever the microprocessor is active. Consequently, though the microprocessor is only active upon completion of data transfer, such events may frequently occur, which lead to significant power consumption by the chip and/or the microprocessor. Moreover, the problem of power consumption is further exacerbated by the GPT remaining active for timing the data transfer.

In many applications, a primary function of the microprocessor is to execute algorithms on data (e.g., to output an overall acceleration of the device, using the above example). The microprocessor may need to collect a number of data samples before executing such algorithms. As a result, the above data transfer process may occur 1000s of times while the microprocessor collects enough data samples (e.g., to retrieve a number that matches or exceeds a threshold value) to perform processing of the data. If the microprocessor is to execute an algorithm that requires M number of data samples, the microprocessor must wait for the peripheral device to generate the M number of samples before it can successfully execute the algorithm (e.g., where M is an integer having a value greater than zero). A problem with such systems is that the microprocessor cannot remain asleep during data collection (e.g., cannot remain in the sleep mode, without interrupt, for an entire duration of collecting the M number of samples). Some systems may include a sensor polling unit to improve the power performance of a chip during data collection. For example, U.S. Pat. No. 8,914,551, filed Apr. 9, 2013, titled "SENSOR POLLING UNIT FOR MICROPROCESSOR INTEGRATION", which is herein incorporated by reference in its entirety, describes a sensor polling unit, which may be utilized to collect data from sensors.

In systems that enable the microprocessor to remain in a sleep mode during data transfer, the microprocessor is interrupted from the sleep mode to process (or pre-process) the data. If the microprocessor is to execute an algorithm of sufficient complexity, data may need to meet certain other conditions. Such 'preconditions' (i.e., the other conditions), when met, increase the likelihood that the microprocessor can successfully execute the algorithm on the data and output a meaningful result. These preconditions require processing beyond collecting a threshold number of data samples and further relate to a content of the data samples. For example, preconditions are inclusive of a format of the data, verifying the data meet one or more criteria, aggregating the data into a data structure, executing a function on the data (e.g., to transform the data and/or identify a state of the data), error checking and/or correcting, data integrity, and/or other processing of content the data.

Some systems do not verify that data meet preconditions; other systems utilize the microprocessor to verify that the data meet preconditions. In systems where no preconditions are verified, the microprocessor can immediately execute the algorithm on the data. If the preconditions are not met and the microprocessor is unaware of such (because it did not verify the preconditions), the microprocessor may generate, based on the algorithm, erroneous output (e.g., incorrect or nonsensical output) and/or error values (e.g., hardware exceptions, software exceptions, and/or interrupts). Such an execution of the algorithm by the microprocessor represents a 'false start' at least because the microprocessor executed the algorithm on data that did not meet the preconditions. In other systems, the microprocessor can determine whether the data meet the preconditions. When the microprocessor determines that the data meet such preconditions, the microprocessor proceeds to execute the algorithm on the data. When the microprocessor determines that the data do not meet such preconditions, the microprocessor prevents execution of the algorithm. In addition, the microprocessor may instruct a data communication interface to collect further data samples before, again, returning to the sleep mode. In the latter case (i.e., the data did not meet the preconditions), the microprocessor was given a false start because it was interrupted from the sleep mode although the data did not meet the preconditions. Because false starts wake the microprocessor (i.e., interrupt it from the sleep mode) and increase the power consumption, reducing false starts can significantly reduce the amount of power consumed by the microprocessor and/or a chip (or board) in which the microprocessor is integrated.

A solution to the above challenges (and others) is to unload data collection and/or data processing from a microprocessor to an improved data collection interface. In some examples, such an improved data collection interface reduces the overall power consumption of a chip in which the microprocessor is integrated (along with the improved data collection interface) by a factor of at least about 2× (e.g., about a 50% reduction in power consumption). The improved data collection interface may be implemented as a stand-alone data collection interface and/or as a system on a chip (SoC). The present disclosure provides systems, methods, and apparatuses that address such challenges by off-loading data collection from a microprocessor to a data collection interface (and/or SoC) using an efficient approach to such data collection over the data collection interface. For example, an improved data collection interface (the interface) can collect a predetermined number of sensor values from a sensor while maintaining active a single communication session with the selected sensor over a pin of the interface; the microprocessor remains in a sleep mode (or other inactive state) for an entire duration of the single communication session. In addition, the present disclosure provides systems, methods, and apparatuses that address such challenges by off-loading data processing from a microprocessor to a data collection interface (and/or SoC), e.g., using hardware with improved power-use characteristics. For example, an improved data collection interface can reduce the likelihood of false starts by using data processing logic blocks to verify that the data meet preconditions prior to interrupting the microprocessor (e.g., pre-processing the data). Because the approaches disclosed herein unload processes from the microprocessor, the microprocessor can avoid frequent switching between GPT and SPI triggers (and removes the need for executing ISRs for each of the GPT and the SPI). Moreover, the microprocessor and the GPT are available for other tasks for the duration of the data transfer due to operation of the improved data collection interface.

The present specification discloses improvements over existing data collection interfaces or SoCs by adding logic blocks (and associated timers, state machines, and registers) to off-load not only data collection but also data processing prior to waking the microprocessor. In such an improved system, the microprocessor may program the logic blocks, timers, state machines, and registers of the data collection interface before entering a sleep more for an entire duration of the interface collecting and processing data (e.g., prepro-cessing) on behalf of the microprocessor. For example, the logic blocks, when executed, perform one or more functions (e.g., error checking, Fourier Transforms, data averaging, verify data integrity, and/or other processing) on the data without waking the microprocessor and, thereby, reduce the power consumption of the microprocessor and/or chip.

FIG. 1 is a block diagram illustrating a system 100 for processing data received from peripheral devices. The system 100 comprises a chip 102, a microprocessor 110, a direct memory access (DMA) controller 112, a memory 114, a data bus 116, a general purpose timer (GPT) 118, data communication interfaces (120, 122, and 124), and sensors 104, 106a-b, and 108. The chip 102 (using the components integrated therein) is operable to collect data from peripheral devices, which, in this case, are the sensors 104, 106a-b, and 108. The chip 102 is embedded with circuitry to operate each of the components including the microprocessor 110, the DMA controller 112, the memory 114, the GPT 118, and the data communication interfaces (i.e., 120, 122, and 124). The data bus 116 operably couples the components to one another. For example, the data bus 116 provides electrical connections by which the other components of the chip can electrically communicate. The data communication interfaces include a three-wire serial peripheral interface (SPI) 120, a four-wire SPI 122, and an inter-intergraded circuit (IIC) 124. Each of the data communication interfaces may be coupled to any number of sensors. While one or more sensors 106a-b are illustrated as two sensors, such sensors may include any number of sensors, n (where n is an integer having a value greater than zero). It is noted that the terms 'data communication interface' and 'interface' are used interchangeably in the present specification only for the sake of brevity. The microprocessor 110 is operable to execute instructions (e.g., software, code, algorithms, preconditions, criteria, and the like). For example, the microprocessor 110 may, when interrupted, retrieve data from one or more of the data collection interfaces and store it in the memory 114. In other cases (e.g., when the data to be transferred is above a threshold size), the DMA controller 112 may transfer the data from a peripheral device to the memory 114 (via one or more of the data collection interfaces). The memory 114 is integrated on the chip 102 (e.g., is an on-chip memory) and can store data used for the operations described herein. The memory 114 is operable to store instructions (e.g., software, code, algorithms, preconditions, criteria, and the like) that are executed to carry out activities and/or to store other data (e.g., sensor values, processed data, and the like) as described in the present disclosure. In one example, the memory 114 is a non-transitory computer-readable storage media. The GPT 118 generates clock signals for use by the components integrated on the chip 102 (e.g., in timing communications).

The chip 102 is operable to collect data from peripheral devices, which, in this case, are the sensors 104, 106a-b, and 108. The chip 102 can utilize the microprocessor 110 to configure one or more of the data communication interfaces 120, 122, and/or 124 to receive a predetermined number of data samples from at least one of the peripheral devices. After such configuration, the microprocessor 110 can enter into a sleep mode while the data communication interfaces collect the predetermined number of data samples, which reduces the amount of power consumed by the microprocessor 110 (and by other components utilized by the microprocessor 110 such as the GPT 118). The peripheral devices can be selectively coupled (e.g., plugged or unplugged) to the data communication interfaces by pins, which are utilized for communication with the peripheral devices.

Each of the data communication interfaces is coupled to one or more sensors by one or more pins. The three-wire SPI 120 is coupled to the sensor 104 by three pins including a serial clock (SCLK) pin, a slave out/slave in (SOSI) pin, and a chip select (CS) pin. The four-wire SPI 122 is coupled to one or more sensors 106a-b by at least four pins including a serial clock (SCLK) pin, a master out/slave in (MOSI) pin, a master in/slave out (MISO) pin, and one or more chip select (CS) pins CS1-CSn (discussed further below). The IIC 124 is coupled to the sensor 108 by two pins including a serial data (SDA) pin and a serial clock (SCLK) pin. The pins of the data communication interfaces are unidirectional (where the direction is indicated by an arrow at one end of the pin the FIG. 1) or bidirectional (as indicated by an arrow at both ends of the pin in FIG. 1) with respect signals carried between the interfaces and the sensors. In the examples illustrated in FIG. 1, the data communication interfaces are in a master-slave relationship with the peripheral devices, where the data communication interfaces are the master and the peripheral devices are the slaves. Note that the direction of the unidirectional pins may flip to an opposite direction in cases where the data communication interfaces are the slaves and the peripheral devices are the masters.

Turning to the serial peripheral interfaces (SPI) 120 and 122, each interface includes a serial clock (SCLK) pin and one or more chip select (CS) pins. The serial clock (SCLK) pin synchronizes the data being transmitted and received through a SCLK period. In some implementations, a byte (8 bits) is transmitted/received after eight SCLK periods (i.e., one bit per SCLK period). In other implementations, a different number of bits may be transmitted during each SCLK period. The SCLK pin is configured as an output when the SPI is in master mode and as an input when the SPI is in slave mode. The SCLK pin is utilized to broadcast clock signals from the SPI to all connected peripheral devices (e.g., sensors). The SCLK is used unidirectionally; the direction depends on whether the SPI is in master or slave mode. A register may store a phase and/or a polarity associated with controlling the clock signals send on the SCLK pin. The CS pin is used by the SPI to select one of the connected peripheral devices. The peripheral device and SPI store a logic level that corresponds to an active level (e.g., active high or active low). In operation, the SPI transmits an active level on a corresponding CS pin to only one peripheral device of the connected peripheral devices (and the only one peripheral device will receive the active level on its corresponding CS pin). The SPI transmits an inactive level (which may correspond to sending no signal at all) on the other CS pins. The peripheral device being sent the active level on the corresponding CS pin is a selected peripheral device for communication with the interface. In a specific example, when the SPI is in master mode, the CS pin transmits an active low output signal. Alternatively, when the SPI is in slave mode, a transfer is initiated by receiving an active low input signal on the CS pin. When the SPI is in master mode, the CS pin can automatically set and/or transmit an active level at the beginning of a transfer and set and/or transmit an inactive level upon completion of the transfer. The SPI transmits and receives 8-bit data until the transfer is concluded by de-assertion of the CS pin (i.e., an active signal is terminated and is not transmitted on the CS pin). When the SPI is in slave mode, the CS pin is always an input. In a multi-slave environment, the SPI supports multiple slaves. When acting as a master of multiple slaves, the SPI can be configured to drive up to n number of CS lines (e.g., CS1, CS2, CS3, . . . , CSn) using a selected peripheral device register. The selected peripheral device register stores a value identifying which of the peripheral devices (in this case sensors) is a selected peripheral device by the CS pin. The other pins (i.e., the SCLK, MOSI, and MISO pins) are shared by all of the slave peripheral devices. There are also override fields to enable software driving of 0 or 1 on the active CS pins, which may be used for special use cases.

Turning to the three-wire serial peripheral interface (SPI) 120, the CS pin operably couples the SPI 120 and the sensor 104. The SOSI pin enables bidirectional data transmission between the SPI 120 and the sensor 104.

Turning to the four-wire serial peripheral interface (SPI) 122, each of the sensors 106a-b is operably coupled to the SPI 122 by a different CS pin (i.e., by one of the corresponding CS pins CS1-*n*). The MOSI pin is configured as an output line when the SPI 122 is in master mode and as an input line when the SPI 122 is in slave mode. The MOSI line on the master (data out) is connected to the MOSI line in the slave device (data in). In some implementations, the data is transferred as byte wide (8-bit) serial data and the most significant bit (MSB) is transferred first. The MOSI pin enables unidirectional data transmission from the SPI 122 to each of the sensors 106a-b. The SPI 122 broadcasts data to the sensors 106a-b (i.e., each sensor receives the same data). However, such data may be designated for the selected peripheral device. The MISO pin is configured as an input line when the SPI 122 is in master mode and as an output line when the SPI 122 is in slave mode. The MISO line on the master (data in) is connected to the MISO line in the slave device (data out). In some implementations, the data is transferred as byte wide (8-bit) serial data and the most significant bit (MSB) is transferred first. The MISO pin enables unidirectional data transmission from the each of the sensors 106a-b to the SPI 122. Each sensor is operable to transmit data over the MISO when selected. Thus, only the selected sensor sends signals to the SPI 122 over the MISO pin. For each of the SPIs 120 and 122 in FIG. 1, the SPI is the master and the sensors are slaves. In other implementations, the SPIs are operable as slaves.

Turning to the inter-intergraded circuit (IIC) 124, each of the IIC 124 and the sensor 108 may be one of a master and a slave (where one is the master and the other is the slave). In operation, the master transmits clock signals to the slave over the SCLK pin and transmits data to the slave over the SDA pin. The slave replies to commands from the master over the SDA pin. The SDA can be used bidirectionally regardless of which device is the master or slave. The SCLK pin is used unidirectionally from the master to the slave. The particular direction of the data transmission over the SCLK pin may change to accommodate either the IIC 124 or the sensor 108 being the master (e.g., due to the direction of signal transmission changing based on which is master). Thus, the SCLK is illustrated as bidirectional in FIG. 1.

The chip 102 may operate within, e.g., a smartphone, a self-driving car, a wearable device (e.g., a smart watch, a fitness tracking device, and the like), a network-connected device (e.g., an Internet of Things (IoT) device, a remote controllable light bulb, a home automation device), a device that includes (or communicates with) multiple sensors, and/or a low-power electronic device. For example, smartphones can include sensors such as accelerometers and gyroscopes. Cars (whether human operated or self-driving) may include sensors such as pressure sensors, global positioning system (GPS) sensors, radar, and light sensors (e.g., cameras, proximity sensors, and the like). The chip 102 may be utilized in a healthcare setting for monitoring vital signs where the peripheral devices (which may include sensors) generate data including, e.g., heart rate, oxygen saturation, temperature, motion, and the like. The chip 102 may be utilized to monitor the "health" of a machine (e.g., manufacturing equipment, laboratory equipment, and the like). In such an example, the peripheral devices may include sensors that measure physical (or environmental) parameters of the machine such as, e.g., vibrations of the machine, temperature of the machine, and/or power characteristics of the machine to proactively identify (e.g., based on trends or evidence present in the data) when performance of the machine is changing (e.g., improving or degrading).

Any of the data collection interfaces of FIG. 1 may allow the microprocessor to remain in a sleep mode (thereby reducing power consumed by the microcontroller) while a predetermined number of sensor values are retrieved and/or processed by the interface. In addition, instead of interrupting (e.g., waking) the microprocessor to perform signal processing, the data collection interfaces can execute logic blocks (which include instructions for performing signal processing) prior to waking the processor. Unloading such processing to the data collection interfaces reduces the power consumed by the microprocessor by allowing the microprocessor to remain inactive for as long as possible. The power savings (relative to waking the microprocessor) may come from eliminating power consumed by the microprocessor executing instructions from memory (e.g., flash, static random-access memory (SRAM)), which, in some applications, is about 50% of the power consumed by the microcontroller.

A data collection interface may take on data processing (from the microprocessor) by executing functions including (but not limited to): a verification function for verifying that data meets preconditions, a transformation function for transforming the data to a form that meets preconditions, an averaging function, an error detection function, a threshold function, a sensor status check function, a format translation function (e.g., to transform the data from a first encoding to a second encoding, transform the data from a sensor's packet formats to a data structure interpretable by an algorithm), a filtering function, a masking function, peak detection, Fast Fourier transform (FFT), Discrete Fourier transform (DFT), and/or a data pre-conditioning function to prepare the data for further processing by an algorithm to be executed by the microprocessor. The data collection interface may execute one or more of the functions on data while the microprocessor is in a sleep mode. Once the processing is completed by the data collection interface, the data collection interface can interrupt the microprocessor to perform further processing on the data (and/or on outputs of the functions).

Figure 2:
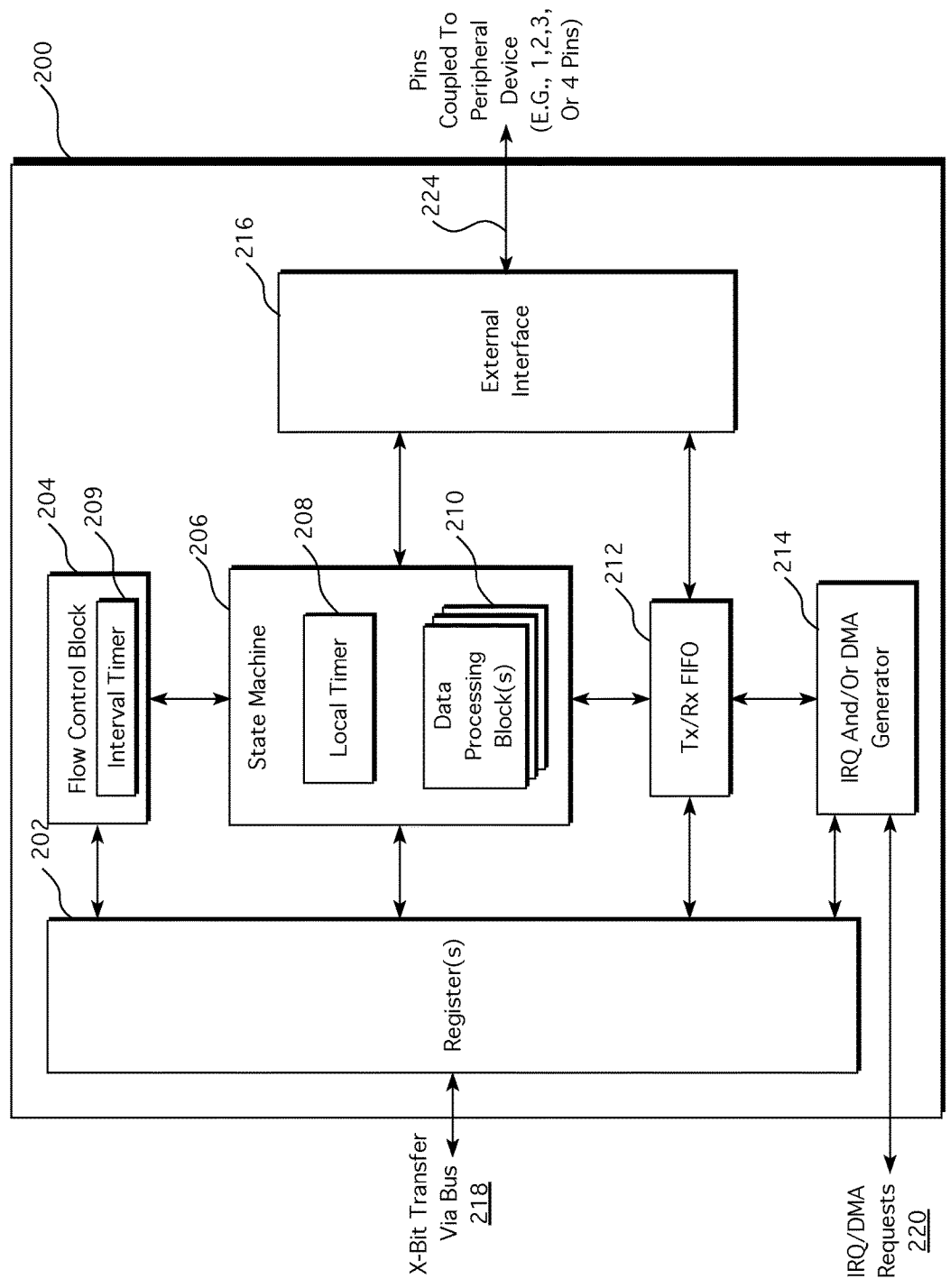
FIG. 2 is a block diagram of an apparatus for processing data according to some embodiments of the present disclosure.

FIG. 2 is a block diagram of a data communication interface 200 for transferring and/or processing data between a microprocessor and peripheral devices, according to some embodiments of the present disclosure. The data communication interface 200 is an example implementation of any one or more of: the three-wire serial peripheral interface (SPI) 120, the four-wire SPI 122, and the inter-intergraded circuit (IIC) 124 of FIG. 1. The data communication interface 200 (of FIG. 2) comprises one or more registers 202, a flow control logic block 204, a state machine 206, a transmit first in first out buffer (Tx FIFO)/receive first in first out buffer (Rx FIFO) 212, an interrupt request (IRQ)/direct memory access (DMA) generator 214, an external interface 216. The flow control block 240 comprises an interval timer 209. The state machine 206 comprises one or more data processing logic blocks 210 and a local timer 208.

The components of the data communication interface 200 cooperate to transfer and/or process data received from peripheral devices. The registers 202 specify a configuration (e.g., operational modes) of the data communication interface 200. In some implementations, the registers 202 are memory mapped registers. The state machine controls operation of the data communication interface 200 based on, among other things, the registers 202 and the flow control logic block 204. The flow control logic block 204 is operably coupled to the registers 202 and the state machine 206. The flow control logic block 204 controls timing of transfers (e.g., holding for wait intervals) using the interval timer 209. The state machine 206 controls transfers (e.g., transmitting commands, receiving data, and handling output from the data processing blocks 210) using, at least in part, the local timer 208. The local timer 208 is operable to generate clock signals. In addition, the state machine 206 generates and transmits commands for controlling peripheral devices. The state machine 206 (and each of the components therein) is operably coupled to each of the registers 202, the flow control module 204, the external interface 216, and the Tx/Rx FIFO 212. The Tx/Rx FIFO 212 stores buffers of data being received (Rx) or transmitted (Tx) via the external interface 216. The Tx/Rx FIFO 212 is operably coupled to the registers 202, the state machine 206, the external interface 216, and the IRQ/DMA generator 214. The IRQ/DMA generator 214 is operable to generate interrupt requests 220. The interrupt requests 220 (which can be generated based, at least in part, on values in the registers 202) are to interrupt a microprocessor (e.g., microprocessor 110 of FIG. 1) and/or to interrupt a DMA controller (e.g., DMA controller 112 of FIG. 1). The IRQ/DMA generator 214 is operably coupled to the registers 202, Tx/Rx FIFO 212, and one or more of a microprocessor and a DMA controller. The external interface 216 communicates with peripheral devices by transferring (i.e., receiving and/or transmitting) signals with the peripheral devices over at least one pin 224. The external interface 216 is operably coupled to the Tx/Rx FIFO 212, the state machine 206, and at least one peripheral device. The following is a description of further details of each of the components.

The one or more registers 202 specify a configuration of the data communication interface 200. The registers 202 comprise a plurality of registers. In operation, data is transferred to and/or from the one or more registers 202 in X-bit units 218. X can be a number that corresponds to a byte (e.g., 8 bits, 16 bits, 24 bits, etc.) or can be any other value (e.g., 1 bit, 2 bits, 3 bits, etc.). The microprocessor can configure the interface 200 by setting values in one or more of the plurality of registers. Each component of the data communication interface 200 may store one or more registers within the registers 202. For example, each of following may have a corresponding register in the registers 202: the flow control logic block 204, the interval timer 209, the state machine 206, the local timer 208, the one or more data processing logic blocks 210, the Tx FIFO/Rx FIFO 212, the IRQ/DMA generator 214, and the external interface 216. In addition, any of the registers can be shared between the components. For example, more than one component may access a same register (and values stored therein). Exemplary (and non-limiting) registers are described in the following description of each component of the data communication interface 200.

The state machine 206 is operable to generate commands for controlling peripheral devices and/or initiate transmission of the commands to the peripheral devices. For example, the state machine 206 generates a read command for transmission to a peripheral device. A read command instructs the peripheral device to transmit data to the data communication interface 200 and/or enables the interface to retrieve the data from the peripheral device. The state machine 206 transmits the read command to the peripheral device. After the transmission is complete, the state machine may wait for an instruction (or indication) from the flow control logic block 204. Upon receiving a prompt (i.e., the instruction or indication) from the flow control logic block 204, the state machine 206 resumes data retrieval by utilizing the external interface 216 to receive and/or retrieve the data from the peripheral device over the pins 224. The state machine 206 can retrieve (e.g., from a state machine register in the registers 202) a value corresponding to an operational mode of the data communication interface 200 and control the operation of other components thereon based on the value corresponding to the operational mode. The value stored (in the register) for the operational mode identifies a selected operational mode. In operation, the state machine 206 controls (e.g., using a local timer) the transfer of data between itself and a peripheral device based on the operational mode.

The flow control logic block 204, at least in part, times operations of the data communication interface 200. The flow control logic block 204 can retrieve (e.g., from the state machine register in the registers 202) a value corresponding to an operational mode of the data communication interface 200 and time the operation of other components thereon based on the value corresponding to the operational mode. In operation, the flow control logic block 204 times (e.g., using an interval timer) the transfer of data between itself and a peripheral device based on the operational mode. As is discussed above, the state machine 206 generates and transmits, to the peripheral device, a read command for initiating data transfer from the peripheral device. After initiating the data transfer, the state machine 206 transfers control of operations to the flow control logic block 204. The state machine holds (e.g., by executing a event listener thread) for the flow control logic block 204 before executing further operations. The flow control logic block 204 generates instructions based on at least one value (e.g., an operational mode value) retrieved from a register and detection of at least one trigger condition (e.g., a trigger corresponding to the operational mode). For example, upon detection of the trigger condition by the flow control logic block 204, the flow control logic block 204 transmits an instruction (e.g., an indication or event Object) to the state machine 206. The instruction (e.g., the indication or event Object) causes the state machine 206 to resume reading data from the peripheral device.

As described above, the flow control logic block 204 may retrieve at least one value from the state machine register (e.g., stored in the registers 202). A state machine register may be implemented as one or more register locations (e.g., each being a specified location in a memory) that take on one of a number of values, each of which corresponds to a different execution of (or state associated with) an operational mode of the data communication interface 200. Operational modes are inclusive of, e.g., an interrupt mode (e.g., executed in either in timer mode or interrupt request mode), a master/slave mode (e.g., specifying whether the interface 200 is a master or a slave, where the master controls communications and the slave responds to prompts from the master), a transfer initiation mode (e.g., specifying conditions that initiate a Rx transfer (receiving data) or initiate a Tx transfer (transmitting data)), and/or a continuous transfer mode (e.g., specifying whether a predetermined number of samples should be transferred in a single CS frame of the DCI 200). As a further illustration of implementing the state machine register, such a register may include a master/slave mode register stored at a memory location (e.g., address 0x9FFF:000F) storing either a first value (e.g., zero) to specify that the data communication interface 200 is the master or a second value (e.g., one) to specify that the data communication interface 200 is the slave. In addition to storing data corresponding to an operational mode, the state machine register may store other values used to operate in a selected operational mode. Such other values may include, e.g., a wait interval associated with the interval timer 209 (e.g., for use in the timer-based mode), an identifier of a pin, an identifier of an active level (e.g., for use in interrupt mode), a predetermined number of values (e.g., for use in continuous transfer mode). The wait interval is an interval of time after which the flow control logic block 204 is to instruct the state machine 206 to retrieve new data output from a/the peripheral device. In some implementations, the interval timer 209 is a timer register storing an actual elapsed interval (measured in second, minutes, clock cycles, and the like) that is used in combination with the local timer 208 to determine whether the wait interval (e.g., a number of clock cycles of the local timer 208) has elapsed relative to a most recent transmission of data (e.g., either relative to a last read command or a last receipt of data from the peripheral device). The wait interval may be stored in a wait interval (WAIT_TMR) register. At each increment of the local timer 208, the SPI compares the actual elapsed interval to the wait interval (e.g., using values stored in the timer register and the WAIT_TMR register) to determine whether the wait interval has elapsed. The identifier of the pin identifies the pin to which the flow control logic block 204 responds to an active level (e.g., identifies a pin on which the flow control logic block 204 is to detect interrupts by receiving an active level on the pin). The identifier of an active level corresponds to a signal level (e.g., a voltage level) that defines the active state of the pin. For example, a high voltage level (relative to the voltage of a ground signal, such as, any voltage that exceeds the ground signal) may correspond to an active level of the pin ('active high' setting). Alternatively, a low voltage level (relative to the voltage of a ground signal, such as, equal to the ground signal) may correspond to an active level of the pin ('active low' setting).

The data communication interface 200 can combine operational modes. For example, the data communication interface 200 can combine the interrupt mode and the master/slave mode by only allowing operation in the timer-based mode when data communication interface 200 is the master (and/or disallow the timer-based mode when it is the slave). The data communication interface 200 can combine the interrupt mode and the continuous transfer mode by operating in continuous transfer mode and simultaneously being in either timer or interrupt mode. Other combinations, though within the scope of the present disclosure, are not enumerated here only for the purpose of brevity. The ability to combine operational modes enables creation of (combinatorial) operational modes that are operable to capture detailed conditional states.

The operational mode values (e.g., within registers for the state machine 206) correspond to operational states of the data communication interface 200. Thus, the state machine 206 executes operational instructions that correspond to an active operational mode value stored in the register. Any change to the operational mode value causes a change in the mode of operation of the data communication interface 200 by changing the operation of the state machine 206. The state machine 206 can utilize other values stored in the state machine register to operate sub-processes of the data communication interface 200 such as parameters of detecting trigger conditions. For example, the state machine 206 may utilize the flow control logic block 204 to detect a trigger condition by detecting one or more events that satisfy a condition set by the operational mode value in the register. Upon detection of a trigger condition, the flow control logic block 204 is operable to cause the state machine to receive (by the Tx/Rx FIFO 212) a predetermined number of values from the selected peripheral device. For example, when in timer mode (i.e., an operational mode), the flow control logic block 204 (after being transferred control by the state machine 206) can use the wait interval to determine whether an elapsed time (e.g., since a least read command was generated) meets or exceeds the wait interval (i.e., a trigger condition corresponding to the timer mode). When the flow control logic block 204 detects that the elapsed time meets or exceeds the wait interval (i.e., the trigger condition is detected), it transmits an instruction to the state machine 206, which causes the state machine 206 to resume reading data from the selected peripheral device (e.g., data corresponding to the predetermined number of values). When the flow control logic block 204 detects that the elapsed time neither meets nor exceeds the wait interval (i.e., the trigger condition is not detected), it does not transmit the instruction to the state machine 206. Alternatively, in the interrupt mode, the flow control logic block 204 detects the trigger condition by detecting an active power level on at least one pin (e.g., the at least one pin being coupled to the selected peripheral device and/or a general-purpose input/output (GPIO) pin). The predetermined number of values identifies the number of values the data communication interface 200 should receive (in the Tx/Rx FIFO 212) from the selected peripheral device while maintaining active a single communication session with the selected peripheral device over a pin being utilized for communication with the selected peripheral device. In some examples, a microprocessor sets the predetermined number of values (e.g., by storing it in a register) based on a number of values required for the microprocessor to execute an algorithm on the values. For serial peripheral interfaces (SPIs) (i.e., whether three- or four-pins), maintaining active the single communication session may correspond to maintaining a chip select pin at an active level (i.e., the chip select corresponding to a selected sensor). For example, FIGS. 3A-C, 4, and 5 illustrate examples of signals sent on pins of an SPI.

The local timer 208, of FIG. 2, is located in the state machine 206. The local timer 208 is operable to generate clock signals at a particular frequency. When the data communication interface 200 is in master mode, one or more clock values stored in a local clock register (within the registers 202), at least in part, define a frequency at which the local timer 208 generates the clock cycles. The local clock register can directly store a frequency value or an identifier corresponding to a frequency value (e.g., a reference to a memory location that stores the frequency value). Alternatively, the local clock register may store one or more values utilized (e.g., by the local timer 208) to determine the frequency. For example, the local clock register may store a primary clock (PCLK) value corresponding to a most recent operating frequency of a GPT (e.g., GPT 110) and a factor ('DIV' factor) for selectively adjusting the operating frequency of the local timer 208 relative to the GPT. In such an example, the frequency 'F' of the local clock 208 can be determined by the equation, $F=PCLK/[2\times(1+DIV)]$. When the data communication interface 200 is in slave mode, the local clock register is to be configured with the phase and polarity of the expected input clock frequency. In both master and slave modes, data is transmitted on one edge of the SCLK signal and sampled on the other. Therefore, it is important that the polarity and phase are configured the same for the master and the slave.

The one or more data processing logic blocks 210 are located in the state machine 206. Each data processing logic block may be implemented, either in whole or in part, in hardware as a fixed-function logic block (e.g., comprising logic gates, flip-flops, and the like) or a programmable logic block. A data processing logic block operates on data retrieved from a peripheral device by the external interface 216. A data processing logic block can include instructions, that when executed, collect the data and/or process the data (e.g., authenticate, verify, or generate output from the data). Each data processing logic block can generate processed data by, e.g., authenticating, verifying, or modifying the data. For example, the data processing logic block may receive, as input, one or more values and generate an output (i.e., the processed data) from the input. In the example of authentication and/or verification, the processed data may be a Boolean value indicating whether the input meets criteria defined within the data processing logic block. In such an example, the input may be included in the output (i.e., the processed data can comprise an unedited copy of the original input that has been verified). In the example of modifying the data, the processed data may be a result of executing a function that modifies the input (e.g., removes, from the input, any values that do not meet a criteria) and/or generates metadata associated with the input (e.g., calculates at least one statistic from the input). Each of the one or more data processing logic blocks 210 is located within the state machine 206. Upon completion of the collecting or the processing, each of the data collection logic blocks 210 can transmit an indication of the completion and/or the processed data to the state machine 206. Upon receiving the indication and/or the processed data, the state machine 206 may trigger further action by components of the interface 200 and/or components external to the interface 200 (e.g., such as a microprocessor or a DMA controller) to collect the processed data.

Each of the one or more data processing logic blocks 210 is operable to execute at least one function on values retrieved from peripheral devices. For example, a data processing logic block may access a register storing a criteria value and execute a comparator to compare the criteria value to one or more of the values retrieved from peripheral devices (or other values derived from the retrieved values). In the example of data collection, the criteria value may be a number of values to be collected and the comparator may compare the number of values to be collected to an actual number of values collected. In the example of data processing, the criteria value may be a target value and the comparator may compare the target value to one or more of the values retrieved from peripheral devices. Other exemplary functions are described below.

A data processing logic block for data collection can be utilized by the data collection interface 200 to collect a predetermined number of values. In some implementations, a microprocessor sets a register value that instructs the interface 200 to execute a data processing logic block for data collection (and/or a register value defining the predetermined number). The microprocessor can sleep for a duration of time in which the interface 200 collects the data. The microprocessor offloads, to the interface 200, processes associated with executing such a data processing logic block. In effect, the microprocessor offloads, to the interface 200, collecting data and operating a timer (which is needed to time the data transfer). Because the interface 200 includes the local timer 208, the interface can time data collection without the need for a GPT timer to be active. Because the interface 200 includes the interval timer 209, the interface can time wait intervals between data reception without the need for the GPT timer to be active. The local timer 208 and the interval timer 209 operate independently of a GPT associated with the microprocessor. Thus both the GPT and the microprocessor can remain in a sleep mode (and thereby reduce power consumption) or are available for executing other processes (and thereby improve operational efficiency).

A data processing logic block for data processing can be utilized by the data collection interface 200 to execute a function on input data (i.e., data received from a peripheral device). A function is inclusive of (but not limited to) any of the following: an averaging function, a data integrity function, a threshold function, a verification function, a status check function, a format translation function, a filtering function, a masking function, a peak detection function, a Fourier transform Fast Fourier transform (FFT), a data pre-conditioning function that prepares the data for further processing by an algorithm to be executed by the microprocessor, and/or any other function or combination thereof. An exemplary data processing logic block executing a verification function verifies that the data meet preconditions (e.g., the preconditions having been set based on an algorithm). An exemplary data processing logic block executing a format translation function transforms data from a first encoding to a second encoding. For example, the format translation function may transform the data to a form that meets preconditions and/or transform the data from a sensor's packet format to a data structure interpretable by an algorithm. An exemplary data processing logic block executing a Fourier transform may execute a Fast Fourier transform (FFT), a Discrete Fourier transform (DFT), or any other Fourier transform.

An exemplary data processing logic block executing a threshold function compares data (e.g., each of a number of sensor values) to a threshold (e.g., stored in a threshold register). The exemplary data processing logic block can include different instruction sets for execution based on whether the data is greater than, less than, and/or equal to the threshold. In some existing systems, a microprocessor is powered up (e.g., interrupted from a sleep mode) to execute a threshold function. In such systems, the microprocessor may wake up to check each sample received from a peripheral device and, as a result, consumes significant computational resources. Because the data collection interface 200 implements a threshold function in a logic block, the microprocessor is prevented from consuming resources associated with the threshold function and, thereby, reduces the power consumed by the microprocessor (e.g., relative to such existing systems). The interface 200 compares the data to the threshold prior to interrupting the microprocessor. Using the logic blocks, the interface 200 may only interrupt the microprocessor when the data meets a threshold criteria associated with the microprocessor (e.g., set by the microprocessor). In some examples, the interface 200 performing threshold functions (instead of the microprocessor) prevents false starts and saves 10-20 fold power.

An exemplary data processing logic block executing an averaging function calculates an average of a set of values and outputs the average. The averaging function may be executed once (e.g., on demand) and/or may be repeatedly executed (e.g., to generate a running average after every X number of samples). In other examples, the averaging function is utilized to generate a corrected value, which accounts for slight variances in sensor reading (e.g., to correct for sensor calibration issues).

An exemplary data processing logic block executing a data integrity function determines whether data contain detectable errors. For example, the data integrity function can be an error detection function. In such an example, the data include one or more error checking bits. The data integrity function operates on one or more error checking bits to authenticate that the packet is received without error. The exemplary data processing logic block can include different instruction sets for execution based on whether the data contains errors. For example, when it is determined that the data contains errors, the interface 200 may discard the data and request another transmission from the source of the data. If no error is detected in the data, the interface 200 may transfer the data to another logic block and/or interrupt a microprocessor. Before the data is transferred form the interface 200 to microprocessor, the logic blocks check whether the data contains detectable errors. The interface 200 detects (using the logic blocks) errors in the data prior to interrupting the microprocessor. Using such logic blocks, the interface 200 may only interrupt the microprocessor when the data is free from detectable errors. Because the microprocessor is only interrupted when no errors are detected, the interface 200 prevents false starts of the microprocessor executing the algorithm and, thereby, improves the power efficiency of the microprocessor.

An exemplary data processing logic block executing a status check function verifies a status of a peripheral device. For example, the status check function compares a status value (e.g., received from the peripheral device) to an acceptable status value (e.g., stored in a register). When it is determined that the status value equal to the acceptable status value, the status check function may generate an indication (e.g., a Boolean value, true, and the like) that the peripheral device has an acceptable status. When it is determined that the status value is not equal to the acceptable status value, the status check function may generate an indication (e.g., a Boolean value, false, and the like) that the peripheral device does not have an acceptable status. In implementations where the peripheral device is a sensor, the status check function may retrieve the status value from a dedicated line coupled to the sensor. The dedicated line may be an electrical pin or contact coupled between the interface 200 that the sensor uses to trigger an interrupt inside the interface 200 so that a chip on which the interface 200 resides can retrieve the data. Alternatively, instead of waiting for interrupt, the interface 200 may proactively read a status value from a register in the sensor to determine whether there is new sensor data available. In such examples, the status value may take one values indicating whether the sensor is operating properly (e.g., "operating with no errors", "operating with errors", "not operational", and/or no signal), whether the sensor has generated new sensor values (e.g., "new data available" or "no new data available"), and/or a combination thereof. The interface 200 is loaded with registers values to interpret such status values and therefore can distinguish "status check data" versus "sample data". In traditional systems, microprocessors may continually check "status check data" to determine when to continue with reading sample data, which requires the microprocessors to be awake (i.e., not in a sleep mode) and consuming power. Using the status check functions described herein, the microprocessor can remain in a sleep mode (or executing other processes) while the interface 200 checks status values.

Within the Tx/Rx FIFO 212, a Tx FIFO stores data to be transmitted out of the data collection interface 200 and an Rx FIFO stores data received, by the interface 200, from an external device. During transmission of data, the interface 200 transmits data from the Tx FIFO. The Tx FIFO can be filled via the registers 202. In some implementations, a microprocessor or DMA controller writes data to the Tx FIFO via the registers. The data are output one bit at a time from the Tx FIFO. As data is received in the Rx FIFO the microprocessor or the DMA controller can retrieve the data from the Rx FIFO and transfer it to another memory element (a memory accessible to the microprocessor, on-chip memory, and/or SRAM). The Rx FIFO and/or the Tx FIFO may comprise multiple memory locations; when one memory location is full, the FIFO rolls over to a next available memory location.

The IRQ/DMA generator 214 is operable to generate interrupt requests 220 based, at least in part, on an IRQ/DMA register. The IRQ/DMA register stores a value that identifies a component to which interrupts should be transmitted. For example, a first value may correspond to a microprocessor and a second value may correspond to a DMA controller. Thus, the value (i.e., the first or the second) stored in the IRQ/DMA register identifies which of the microprocessor and the DMA controller is to be interrupted.

The external interface 216 comprises at least one pin 224, which is for coupling the data communication interface 200 to at least one peripheral device. The external interface 216 is utilized to communicate with peripheral devices by transferring (receiving and/or transmitting) signals with the peripheral devices. The at least one pin 224 can comprise any of the pin configurations disclosed herein (e.g., as described with respect to any of the data communication interfaces 120, 122, and 124 of FIG. 1 and/or the three- and four-pin configurations described with respect to FIGS. 3A-3C, 4, and 5) and other pin configurations. The external interface 216 may transmit an active signal on a CS pin based on which CS pin corresponds to a peripheral device register identified in a selected peripheral device register. The selected peripheral device register stores a value identifying (e.g., by the CS pin) which of the peripheral devices is the selected peripheral device. In the example of sensors, the selected peripheral device register is a sensor register the can store a value identifying which of one or more sensors is a selected sensor for communication over a corresponding pin.

In the example of FIG. 2, the data communication interface 200 has built-in timers (i.e., local timer 208 and interval timer 209) for timing data transfers and wait intervals. The required timing intervals between data acquisitions are stored in one or more timer control registers at the start of a data transfer. For example, after a microprocessor configures the interface 200 in a timer mode, the microprocessor enters into a sleep mode. While the microprocessor remains in the sleep mode, the interface 200 times itself using the interval timer 209 and/or the local timer 208 and continues with periodic data reception until the entire data transfer is completed (e.g., until a predetermined number of samples is collected). Because the events are self-timed by the interface 200, the data transfer from the interface 200 to an on-chip memory can happen using, e.g., a DMA controller. The microprocessor can completely avoid initiating burst transfers and switching between Interrupt Service Routines (ISRs) for a general purpose timer (GPT) and ISRs for the interface 200 due, at least in part, to the interface 200 timing its own transfers. If the system requires more processing (e.g., at the cost of power), the microprocessor and the GPT can be used for other tasks while the interface 200 transfers data. Some implementations of the data communication interface 200 are included in a system on chip (SOC) package, either in part, or in whole. An effect of bundling all features within the interface 200 is an order of magnitude reduction in power when only the interface 200 is powered with some local storage, while other components on a common chip or SOC are powered down (other components on a same chip as the interface 200). In addition, the microprocessor does not execute two sets of ISRs (i.e., does not execute one set of ISRs for the GPT and another one set of ISRs for an interface) and only executes a single set of ISRs (i.e., only executes the ISRs for the interface 200). Because the interface 200 can time its own transfers (and wait intervals), the GPT remains inactive (e.g., in a sleep mode) and the ISRs for the GPT are not executed by the microprocessor.

Figure 3C:
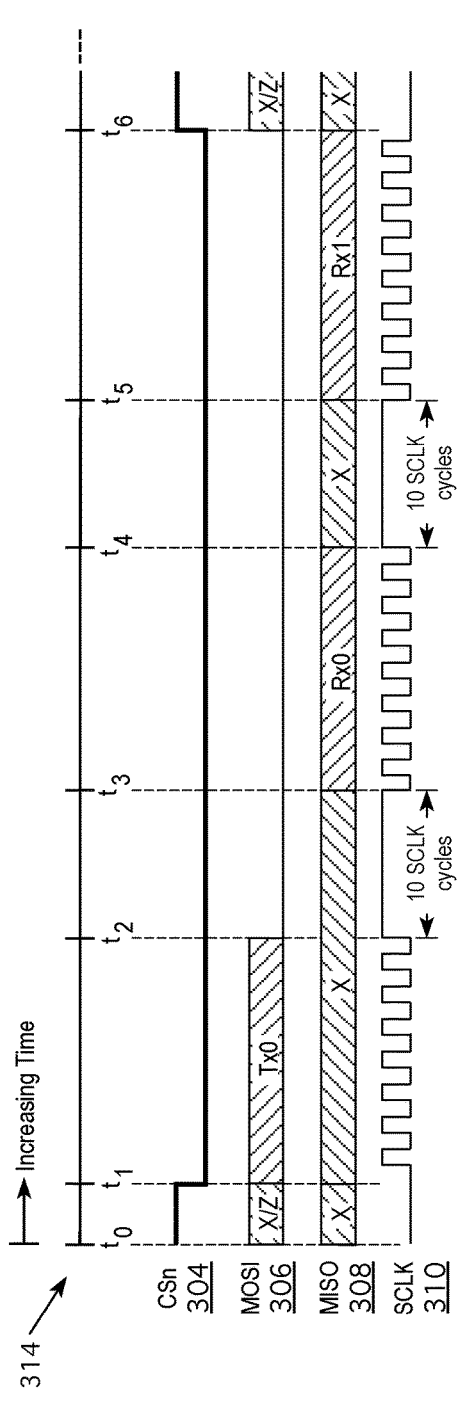

FIGS. 3A, 3B, and 3C are described, below, in the context of an embodiment of a four-pin serial peripheral interface (SPI) (i.e., a particular embodiment of the data communication interface 200 of FIG. 200). In this embodiment, the four-pin SPI implements configuration registers (e.g., similar to registers 202 of the interface 200) that are used for initiating transfers, interrupting the SPI (e.g., based on an underflow or overflow of a Rx or Tx FIFO), and/or for controlling operations of the SPI (i.e., by a flow control logic block).

The configuration registers control the manner in which an SPI transfer is initiated. A master mode enable (MASEN) bit identifies whether the SPI is in master mode or slave mode (e.g., an implementation of a master/slave mode register). For example, the SPI is a slave when the MASEN bit is zero; the SPI is a master when the MASEN bit is one. An interrupt mode (TIM) bit identifies a transfer and interrupt mode of the SPI (i.e., a manner in which an SPI serial transfer is initiated). Setting the TIM bit places the SPI in transmit (Tx) initiated transfer mode. Clearing the TIM bit places the SPI in receive (Rx) initiated transfer mode. When the TIM bit is set (e.g., set to a first value, such as one), writing to the to the Tx FIFO initiates a transfer (i.e., from the Tx register to a peripheral device). The transfer is interrupted when the number of byes transferred is equal to value stored (e.g., in binary form) in an IRQ mode (IRQ-MODE) bit register plus 1 (i.e., interrupt when number of bytes transmitted=IRQMODE+1). When the TIM bit is cleared (e.g., set to a second value such as zero), reading from the Rx FIFO initiates a transfer (i.e., from the peripheral device to the Rx register). The reading must be done while the SPI is idle. A read executed during an active transfer will not initiate another transfer. The TIM bit controls, at least in part, whether the SPI is in transmit (Tx) initiated transfer mode or receive (Rx) initiated transfer mode.

In Tx-initiated transfer mode, the SPI begins transmitting data as soon as the first byte is written to the Tx FIFO. The SPI transfer of the first byte happens immediately. The SPI uses a continuous transfer enable (CON) bit to determine whether to transmit additional data beyond the first byte. The CON bit identifies whether the SPI is in a continuous transfer mode. When the continuous transfer mode is enabled (e.g., the CON bit is set to one) and the interrupt mode is enabled (e.g., the TIM bit is set to one), the SPI transfers data from the Tx FIFO until either: (1) a specified number of bytes have been transferred (e.g., the number of bytes being specified in a transfer byte count (CNT) register), or (2) no valid data is available in the Tx FIFO (e.g., valid data being data that has not already been transmitted)

in cases where the number of bytes is unspecified (e.g., the CNT register is set to zero). In this example, the CNT register identifies a number of bytes. In other examples, the CNT register may identify the amount of data in any unit of measure of data (e.g., bits, bytes, or multiples thereof such as kilo-, mega-, giga-, etc.). The CS pin is asserted (i.e., an active signal is transmitted on the CS pin) and remains asserted for the complete duration of each 8-bit (1 byte) serial transfer (e.g., where transfers repeat with stall periods between each of the transfers). Thus, a single SPI frame (i.e., a single communication session) includes data collected from multiple 8-bit serial transfers. The active signal on the CS pin maintains the single communication session with a selected sensor for the duration of the transfer from the Tx FIFO (i.e., from the start of the transfer through the end of the transfer).

In Rx-initiated transfer mode, the size of transfers initiated by a read of the Rx FIFO depends on the IRQ mode (IRQMODE) bit. As discussed above, the IRQ mode (IRQMODE) bit specifies a number (e.g., in binary form) of byes to be transferred minus one before the SPI is interrupted. Thus, the number of bytes to be transferred is IRQMODE+1. For example, when the IRQMODE is set to 7 (i.e., binary value of 111) and a read to the Rx FIFO occurs, the SPI master initiates an 8-byte transfer after which the SPI is interrupted. When the continuous transfer mode is enabled (e.g., the CON bit is set to one) and the interrupt mode bit is disabled (e.g., the TIM bit is set to zero, or cleared), the SPI continues to transfer data until the Rx FIFO is full. The CS pin is asserted and remains asserted for the duration of repeated 8-bit serial transfers until the Rx FIFO is full (e.g., where transfers repeat with stall periods between each of the transfers). Again, a single SPI frame includes data collected from multiple 8-bit serial transfers. The active signal on the CS pin maintains a single communication session with a selected sensor for the duration of the transfer to the Rx FIFO (i.e., from the start of the transfer until the Rx FIFO is full). If the CON bit is set, the 8-byte transfers occur repeatedly and continuously with no de-assertion of CS pin between bytes (i.e., an active signal is terminated and is not transmitted on the CS pin). If the CON bit is cleared, the 8 bytes will happen with stall periods between transfers, where the CS pin will be de-asserted. However, in continuous mode, if the CNT register is set to a value greater than 0, then CS pin will be asserted for the entire frame duration. Table 1 (below) lists exemplary binary values and corresponding actions taken by the SPI based on the binary values.

TABLE 1

Exemplary binary values and corresponding actions taken by the SPI (based on the values) during data transmission (Tx) or data reception (Rx).

| Binary Value | Exemplary Action by SPI during Tx or Rx |
| --- | --- |
| 000 | Tx interrupt occurs when 1 byte has been transferred. Rx interrupt occurs when 1 or more bytes have been received into the FIFO. |
| 001 | Tx interrupt occurs when 2 bytes have been transferred. Rx interrupt occurs when 2 or more bytes have been received into the FIFO. |
| 010 | Tx interrupt occurs when 3 bytes have been transferred. Rx interrupt occurs when 3 or more bytes have been received into the FIFO. |
| 011 | Tx interrupt occurs when 4 bytes have been transferred. Rx interrupt occurs when 4 or more bytes have been received into the FIFO. |
| 100 | Tx interrupt occurs when 5 bytes have been transferred. Rx interrupt occurs when 5 or more bytes have been received into the FIFO. |
| 101 | Tx interrupt occurs when 6 bytes have been transferred. Rx interrupt occurs when 6 or more bytes have been received into the FIFO. |
| 110 | Tx interrupt occurs when 7 bytes have been transferred. Rx interrupt occurs when 7 or more bytes have been received into the FIFO. |
| 111 | Tx interrupt occurs when 8 bytes have been transferred. Rx interrupt occurs when the FIFO is full. |

Regardless of whether in Rx or Tx initiated transfer mode (e.g., based on the TIM bit), the SPI uses a frame continue (FRAMECONT) bit to identify whether the single SPI frame should include more than one byte in the SPI frame. When the FRAMECONT bit is cleared (i.e., is set to zero) and the CNT bit is set >0, the SPI will transfer only one frame of data (e.g., either transmit from the Tx FIFO or added to the Rx FIFO as the case may be) and no more frames. In such a case, the one frame includes the specified number of bytes (e.g., the number of bytes being specified in the CNT register). When the FRAMECONT bit is set (i.e., is set to one), multiple frames are transferred and each frame includes the specified number of bytes. The transfer will continue until (and/or ends when) the Tx FIFO no longer contains valid data or until the Rx FIFO is full. When there is no data/space in FIFO (i.e., underflow or overflow, respectively), the transfer will stall until it the data/space is available. The SPI stalls by not clocking the serial clock (e.g., not transmitting clock signals on the SCLK pin) until the data/space is available.

When the continuous transfer mode is disabled (e.g., the CON bit is set to zero), each SPI frame consists of data collected from a single, 8-bit serial transfer. If the data is larger than 8 bits, then multiple transfers occur with a stall period between each transfer. The CS pin is toggled to an inactive signal during the stall period. Thus, each SPI frame includes data collected from only one 8-bit serial transfer. When the continuous transfer mode is disabled (e.g., the CON bit is set to zero) and the interrupt mode is enabled (e.g., the TIM bit is set to one), the SPI initiates new transfers until no valid data is available in the Tx FIFO. When the continuous transfer mode is disabled (e.g., the CON bit is set to zero) and the interrupt mode is disabled (e.g., the TIM bit is set to zero), the SPI initiates new transfers until the Rx FIFO is empty.

The configuration registers control the phase and polarity of the local clock in the SPI. A serial clock phase mode (CPHA) bit identifies the phase of the local clock. When the CPHA bit is set to a first value (e.g., one), the local clock pulses at the beginning of each serial bit transfer. When the CPHA bit is set to a second value (e.g., zero), the local clock pulses at the end of each serial bit transfer. A serial clock polarity (CPOL) bit identifies the polarity of the local clock. When the CPOL bit is set to a first value (e.g., zero), the local clock idles low (and is active high). When the CPOL bit is set to a second value (e.g., one), the local clock idles high (and is active low). The SPI may synchronize the polarity and phase with the selected peripheral device (e.g., by transmitting and/or receiving phase and polarity values with the peripheral device slave, or setting the polarity and phase of the slave to match that of the SPI).

The configuration registers control whether the SPI is interrupted for overflows of the Rx FIFO. In the implementation of FIGS. 3A, 3B, and 3C, the SPI simultaneously receives data and transmits data during data transmission. Therefore, during the data transmission (i.e., transmitting data from the Tx FIFO), the SPI is also receiving data and storing it in the Rx FIFO. A data overflow occurs when there is no space left in the Rx FIFO to store incoming data without overwriting existing data that has not already been read from the Rx FIFO. For example, if the received data is not read from the Rx FIFO (and/or the Rx FIFO is already full) the data overflows the Rx FIFO and, as a result, an overflow interrupt will be generated within the SPI. An Rx FIFO flush enable (RFLUSH) bit is used to initiate flushing (e.g., resetting, ignoring, or otherwise erasing) data from the receive (Rx) FIFO. When the RFLUSH bit is set (e.g., set to a first value such as one), the SPI initiates clearing the Rx FIFO. While the RFLUSH bit is set, and all received data is ignored and no interrupts are generated based on overflow of the Rx FIFO. When the RFLUSH bit is cleared (e.g., is set to a second value such as zero), the SPI disables clearing the Rx FIFO. The Rx FIFO flush enable (RFLUSH) bit can be set to prevent the received data from being saved to the Rx FIFO and, therefore, prevent the Rx FIFO overflowing since the data is flushed (e.g., in cases where the received data is to be intentionally ignored and/or where code executed by the SPI does not read Rx FIFO). Alternatively, the RFLUSH bit can be cleared to allow data to overflow the Rx FIFO in cases where the SPI reads at least some of the received data from the Rx FIFO. In such cases, the interrupt (due to Rx FIFO overflow) may be disabled even in cases when the received data overflows the Rx FIFO (e.g., in cases where the SPI intentionally ignores overflow conditions and/or where code executed by the SPI does not respond to overflow conditions) by clearing a Rx-overflow interrupt enable (RXOVR) bit in the configuration register. The RXOVR bit controls, at least in part, whether the SPI is interrupted by Rx FIFO overflows. Setting the RXOVR bit to a first value (e.g., zero) disables the Rx-overflow interrupt and prevents the SPI from interrupting the microprocessor in case the Rx FIFO overflows. Setting the RXOVR bit to a second value (e.g., one) enables the Rx-overflow interrupt and the SPI interrupts the microprocessor when the Rx FIFO overflows.

The configuration registers control whether the SPI is interrupted for underflows of the Tx FIFO. In the implementation of FIGS. 3A, 3B, and 3C, the SPI simultaneously receives data and transmits data during data reception. Therefore, during the data reception (i.e., storing received data in the Rx FIFO), the SPI is also transmitting data from the Tx FIFO. A data underflow occurs when data for transmission is not written to the Tx FIFO during a data transmission from the Tx FIFO. If new data (replacing already transmitted data) is not written to the Tx FIFO an underflow interrupt will be generated by the SPI. A Tx FIFO flush enable (TFLUSH) bit is used to initiate flushing (e.g., resetting, ignoring, or otherwise erasing) data from the transmit (Tx) FIFO. When the TFLUSH bit is set (e.g., set to a first value such as one), the SPI initiates clearing the Tx FIFO. When the TFLUSH bit is cleared (e.g., is set to a second value such as zero), the SPI disables clearing the Tx FIFO. The TFLUSH bit can be set to prevent an underflow in the Tx FIFO since the data in the Tx FIFO is flushed (e.g., in cases where there is no data to be sent and/or where code executed by the SPI does not transmit data). The TFLUSH bit being set prevents interrupting the SPI when an underflow condition exists in the Tx FIFO. Alternatively, the TFLUSH bit can be cleared to allow underflows of the Tx FIFO in cases where the SPI transmits at least some of the data from the Tx FIFO. In such cases, the interrupt (due to Tx FIFO underflow) may be disabled even in cases when an underflow exists for the Tx FIFO (e.g., in cases where the SPI intentionally ignores underflow conditions and/or where code executed by the SPI does not respond to underflow conditions) by clearing a Tx-underflow interrupt enable (TXUNDR) bit in the configuration register. The TXUNDR bit controls, at least in part, whether the SPI generates interrupts for Tx FIFO underflows. Setting the TXUNDR bit to a first value (e.g., zero) disables the Tx-underflow interrupt and prevents the microprocessor being interrupted by the Tx FIFO underflowing. Setting the TXUNDR bit to a second value (e.g., one) enables the Tx-underflow interrupt and the microprocessor is interrupted by the Tx FIFO underflowing.

The configuration registers include a flow control register for use in controlling operations of the SPI. In the implementation of FIGS. 3A, 3B, and 3C, the configuration registers of the SPI supports, among other operational modes, the interrupt mode (i.e., configured to be set in either in timer mode or interrupt request mode) and the master/slave mode (i.e., configured to be set as either the master of the slave). In addition, the configuration registers store other values including a wait interval associated an interval timer (e.g., for use in the timer mode), an identifier of a pin (i.e., the pin on which an active level causes an interrupt of the SPI), a read data burst size (RDBURSTSZ) register, a CNT register, and a transmit byte count (TXBYTES) register. The RDBURSTSZ register identifies an amount of data (e.g., a number of bytes, a number of bits, a number of data samples, and the like) be received in a single burst from a slave before waiting for the flow-control logic block (e.g., by stalling the clock signals by the wait interval). The transmit byte count (TXBYTES) register identifies a number of bytes to transmit before reading data from a slave peripheral device. In the implementation of FIGS. 3A-3C, this resister stores the number of bytes to be transmitted—1 (i.e., since the byte count begins at 0). This includes all the bytes that need to be sent out to the slave (e.g., a command byte and an address byte, if required).

The interrupt mode register may be set to the timer mode. The SPI includes a 16-bit timer (i.e., the interval timer) clocked at the local clock rate to introduce wait-states while reading data. When in timer mode, a flow control logic block in the SPI uses the wait interval to determine whether an elapsed time (e.g., since a last read command was generated or since data was last read from a peripheral device) meets or exceeds the wait interval (i.e., a trigger condition corresponding to the timer mode). The SPI waits until the wait interval ends on the interval timer and, at the expiration of the wait interval, the SPI reads a number of bytes as specified by the RDBURSTSZ register (i.e., RDBURSTSZ+1 number of bytes since the byte count begins at 0). For example, when the flow control logic block in the SPI detects that the elapsed time meets or exceeds the wait interval (i.e., the trigger condition is detected), it transmits an instruction to a state machine in the SPI, which causes the state machine to resume the read transfer. After reading the specified number of bytes, the SPI enters into a wait state and simultaneously restarts the interval timer. The SPI again waits until the expiration of the interval timer to continue the data reception. This process repeats until the total number of bytes received is equal the value specified by the CNT register.

The interrupt mode register may be set to the interrupt mode. In the interrupt mode, the SPI is interrupted when it detects an active level being sent on the pin identified by the identifier stored in the configuration registers. In the implementation of FIGS. 3A, 3B, and 3C, the identifier identifies a MISO pin of the SPI (which connects the SPI to a slave peripheral device) or a RDY pin (which connects the SPI to one or more general-purpose input/output devices (GPIOs)). The flow control logic block in the SPI detects the trigger condition by detecting an active power level on the pin identified by the identifier. When the identifier identifies the MISO pin, the SPI waits (holds in a wait mode) until it detects an active level on the MISO pin. When the SPI detects a transition from an inactive level to an active level (i.e., detects the trigger condition corresponding to the interrupt mode) on the MISO pin, the SPI reads (from the slave peripheral device to which it is connected by the MISO pin) the number of bytes specified by the RDBURSTSZ register (i.e., RDBURSTSZ+1 number of bytes). After reading the data from the slave peripheral device, the SPI goes back into the wait state until it, again, detects an active level on the MISO pin. This process repeats until the SPI receives, in total from the slave peripheral device, a number of bytes that is equal the value specified by the CNT register. Alternatively, when the identifier identifies the RDY pin, the SPI waits (holds in a wait mode) until it detects an active level on the RDY pin. When the SPI detects a transition from an inactive level to an active level (i.e., detects the trigger condition corresponding to the interrupt mode) on the RDY pin, the SPI reads (from the slave GPIO device to which it is connected by the RDY pin) the number of bytes specified by the RDBURSTSZ register (i.e., RDBURSTSZ+1 number of bytes). After reading the data from the slave GPIO device, the SPI goes back into the wait state until it, again, detects an active level on the RDY pin. This process repeats until the SPI receives, in total from the slave GPIO device, a number of bytes that is equal the value specified by the CNT register.

In some implementations, the value specified by the CNT register is an integer multiple of RDBURSTSZ+1 (i.e., regardless of whether the SPI is in the timer mode based on the interval timer, interrupt mode based on the MISO pin, and/or interrupt mode based on the MISO pin). This enables the SPI to read the same amount of data at each iteration (i.e., RDBURSTSZ+1) and results in the final (total) amount of data read being an integer multiple of RDBURSTSZ+1.

FIGS. 3A-3C, 4, and 5 illustrate signals generated on serial peripheral interface (SPI) pins during a data transfer that is controlled by a flow controlled logic block during a single communication session, according to an embodiment of the present disclosure. The data is transferred between the SPI (which is described extensively above) and a peripheral device. The SPI is the master and the peripheral device is the slave. In each Figure, the signals are transferred in a single SPI frame (i.e., the single communication session) and are shown with timing relative to a timeline. Each timeline begins at time t0 and continues therefrom in order of t1, t2, t3, etc.

FIGS. 3A-3C, FIGS. 3A-3C illustrate signals sent on each pin of a four-pin SPI during a single SPI frame, according to some embodiments of the present disclosure. The pins include one or more chip select (CS) pins CSn 304, a master out/slave in (MOSI) pin 306, a master in/slave out (MISO) pin 308, and a serial clock (SCLK) pin 310. The SPI includes a local timer (e.g., a serial clock) (not shown) used to generate the clock signals on the SCLK pin 310. The SPI uses the local timer (and the corresponding clock signals) to coordinate relative timing of signals transmitted by the SPI (on the MOSI pin 306) and signals received by the SPI from the peripheral device (on the MISO pin 308). The SPI includes an interval timer (e.g., implemented as a timer register) for timing wait intervals between receptions of data (e.g., reads) from the peripheral device.

Turning to FIG. 3A, FIG. 3A illustrates an example where the transfer data is received by the SPI from the peripheral device based on the SPI transmitting a read command to the peripheral device (e.g., using a state machine). The signals are shown with timing relative to timeline 302. At time t0, the CS pin 304 is not asserted and the SCLK pin 310 is inactive (i.e., held in a constant state not sending clock signals).

At time t1, the SPI asserts the CS pin 304 by transmitting an active signal on the pin and initiates transmission of a read command to the peripheral device over the MOSI pin 306. The CS pin 304 is an active low pin and, therefore, the active level of the pin is a low voltage level (i.e., a voltage level on the CS pin 304 decreases from a high voltage to a lower voltage level at time t0 to enter the active state). The SPI generates clock signals on the SCLK pin 310 to time the transmission of the read command (labeled 'Tx0' in FIG. 3A) to the peripheral device over the MOSI pin 306. The read command is retrieved from a Tx register of the SPI for transmission to the peripheral device. During the time period between t1 and t2 the SPI transmits the read command to the peripheral device.

At time t2, the SPI completes transmission of the read command to the peripheral device, begins stalling the output clock signals, and begins timing the wait interval. Though the local timer is still operating and generating clock signals, the SPI stalls the output of the clock signals by not sending the clock signals over the SCLK pin 310. During the interval between time t2 and time t3, the SPI stalls the output of the SCLK pin 310 for N number of cycles of the local timer (i.e., labeled 'N SCLK cycles' in FIG. 3A). The number of cycles (i.e., the wait interval) is retrieved by the SPI from the WAIT_TMR register. The SPI utilizes the timer register (i.e., the interval timer) to store a count of an actual number of clock cycles that have elapsed since the transmission of the read command (i.e., since time t2). At each increment of the local timer (during the time between t2 and t3), the SPI compares a value stored in the timer register and a value stored in the WAIT_TMR register to determine whether the wait interval has elapsed. In some examples, the wait interval corresponds to a data output frequency of the peripheral device (e.g., a data sample rate of a sensor). By holding for the wait interval, the SPI reads data from the peripheral device at about the same frequency at which the peripheral device generates output data.

At time t3, the SPI detects that the wait interval has elapsed and begins reading data from the peripheral device. The SPI detects that the wait interval has elapsed by determining that the value stored in the timer register is greater than or equal to and the value stored in the WAIT_TMR register. The SPI resets the interval timer by resetting the timer register (e.g., to zero). During the interval between time t3 and time t4, the SPI receives a data sample (labeled 'Rx0') from the peripheral device over the MISO pin 308. The data sample is stored in an Rx register of the SPI. In this example, the SPI reads only one data sample from the peripheral device after each wait interval. However, the SPI reads may read 'bursts' of data including any number of data samples from the peripheral device after each wait interval. The SPI utilizes the read data burst size (RDBURSTSZ) register to determine the amount of data to read in a single burst from the peripheral device before stalling for the wait interval. In the example of FIG. 3A, the RDBURSTSZ register identifies a number of bytes minus one (i.e., the number of bytes to be read=RDBURSTSZ+1). Thus, the RDBURSTSZ register contains a value of zero, which corresponds to reading 0+1=1 byte.

At time t4, the SPI completes reading the data sample from the peripheral device over the MISO pin 308, begins stalling the output clock signals, and begins timing the wait interval using the timer register. The SPI stores a sum register that identifies a sum of an amount of data received from the peripheral device in the current SPI frame. The units of measure of the sum register match those of the CNT register (e.g., both measured in bytes, bits, or a multiple thereof). The SPI increments the sum register by a value that corresponds to the size of to the data Rx0. The SPI compares a value in the sum register to a value in the CNT register to determine whether to end the SPI frame. The SPI determines that the value in the sum register is less than the value in the CNT register and, therefore, continues reading data (and does not end the SPI frame). During the interval between time t4 and time t5, the SPI, again, times the wait interval as described above with respect to the wait interval between time t2 and time t3. The SPI utilizes the timer register (i.e., the interval timer) to store a count of the actual number of clock cycles that have elapsed since the data was last read over the MISO pin 308 (i.e., since time t4).

At time t5, the SPI detects that the wait interval has elapsed, begins reading additional data from the peripheral device, and resets the interval timer. During the interval between time t5 and time t6 the SPI receives the additional data sample (labeled 'Rx1' in FIG. 3A) from the peripheral device over the MISO pin 308. Again, the data sample is stored in the Rx register of the SPI.

At time t6, the SPI completes reading the additional data sample from the peripheral device over the MISO pin 308, begins stalling the output clock signals, and begins timing the wait interval using the timer register. During the interval between time t6 and time t7, the SPI, again, times the wait interval as described above with respect to the wait interval between time t2 and time t3.

During the interval between times t7 and t8, the SPI repeatedly reads data samples and holds for the wait interval, e.g., each repeat being as described with respect to the interval between times t5 and t7. Also, the SPI repeatedly increments the sum register and determines that the value in the sum register is less than the value in the CNT register and, therefore, continues reading data (and does not end the SPI frame).

At time t8, the SPI detects that the wait interval has elapsed and begins reading further data from the peripheral device. During the interval between time t8 and time t9 the SPI receives the further data sample (labeled 'RxM' in FIG. 3A) from the peripheral device over the MISO pin 308. The data sample is stored in the Rx register of the SPI.

At time t9, the SPI completes reading the additional data sample from the peripheral device over the MISO pin 308. The SPI increments the sum register by a value that corresponds to the size of the data sample RxM and compares the value in the sum register to the value in the CNT register to determine whether to end the SPI frame. At this point, the SPI has repeated, M+1 number of times, the process of waiting for the wait interval and collecting a data sample over the MISO pin 308. At time t9, the SPI determines that the value in the sum register is equal to the value in the CNT register and ends the SPI frame by transition the CS pin from the active level (i.e., the low voltage) to an inactive level (i.e., the high voltage). After the SPI has transferred the data to the Rx FIFO, the SPI utilizes data processing logic block to execute a function (or a combination of functions) on the data samples prior to interrupting a processor to execute an algorithm on the data samples.

In the example of FIG. 3A, a single CS frame includes data collected from multiple reads of data from the peripheral device. The single CS frame begins at time t1 and ends at time t9. During the CS frame, an active signal is maintained on the CS pin that connects the SPI to the peripheral device for the duration of the transfer to the Rx FIFO. In this example, the M+1 number of transfers was predetermined (e.g., determined in advance of the transfer) based on the CNT register. A microprocessor sets the CNT register based on a number of data samples required for the microprocessor to execute an algorithm on the values.

Turning to FIG. 3B, FIG. 3B illustrates a specific example where the transfer data is received by the SPI from the peripheral device based on the SPI transmitting a read command to the peripheral device. The operation is similar to that as described with respect to the FIG. 3A and the details are not repeated here only for brevity. In this example, the SPI stores the following specific values in the registers: the serial clock phase mode (CPHA) bit is set to one (e.g., configuring the local clock to pulse at the beginning of each serial bit transfer), the serial clock polarity (CPOL) bit is set to zero (e.g., configuring the local clock to idle at the low voltage level and have an active level of the high voltage level), the transmit byte count (TXBYTES) register is set to zero (e.g., configuring the SPI to transmit 1 byte before reading data from the slave (i.e., TXBYTES+1=0+1)), the transfer byte count (CNT) register is set to 4 (e.g., the predetermined number data samples to collect during a single communication session and configuring the SPI to collect 4 data samples), the read data burst size (RDBURSTSZ) register is set to one (e.g., configuring the SPI to collect 2 (i.e., RDBURSTSZ+1=1+1)), and the wait interval (WAIT_TMR) register is set to 10 (e.g., configuring the SPI to wait for 10 clock cycles of the local timer). The SPI uses the specific values in the registers to control the transfer of data.

In the example of FIG. 3B, the SPI asserts the CS pin 304 (i.e., at time t1) and transmits (i.e., between times t1 and t2) a single-byte read command (labeled 'Tx0' in FIG. 3B) over the MOSI pin 306. The SPI then waits 10 clock cycles (i.e., between times t2 and t3) before reading a two-byte burst of data (labeled 'Rx0' and 'Rx1' in FIG. 3B). The SPI again waits 10 clock cycles (i.e., between times t5 and t6) before reading a two-byte burst of data (labeled 'Rx2' and 'Rx3' in FIG. 3B). At time t8, the SPI determines that the value in the sum register (corresponding to four bytes having been read) is equal to the value in the CNT register (corresponding to the predetermined four bytes of data to be read) and ends the SPI frame by transition the CS pin from the active level (i.e., the low voltage) to an inactive level (i.e., the high voltage). A single CS frame includes data collected from multiple reads of data from the peripheral device. The single CS frame begins at time t1 and ends at time t8.

It is noted that while stalling the clock signal output (i.e., stalling the SCLK pin 310 during the wait intervals) for flow-control or FIFO data/space unavailability, the last SCLK edge is always a sampling edge (i.e., a falling signal, in this example). Thus, when the wait period ends, the first signal sent to the slave is a driving edge (i.e., a rising signal, in this example). Although the SCLK pin 310 signal idles LOW when the CPOL bit is set to zero and idles HIGH when the CPOL bit is set to one, the CPHA bit determines the sequence of sampling and driving edges. Therefore, for a CPHA=1, the SCLK signal is stalled at the same level as the idle level. However, when the CPHA bit is set to zero, the SCLK pin is stalled at the opposite level to the idle level. At the end of a transfer (i.e., when CS is not asserted), the SCLK pin is always idled as per CPOL. Table 2 below includes a summary of how the combination of the CPOL bit and the CPHA bit affect the SCLK idle and stall levels. FIG. 3C illustrates an example where the SCLK pin 310 idles low and stall high (i.e., based on the CPHA bit being set to zero and the CPOL bit being set to zero).

| CPHA | CPOL | SCLK Idle level | SCLK Stalled level |
|---|---|---|---|
| 0 | 0 | 0 | 1 |
| 0 | 1 | 1 | 0 |
| 1 | 0 | 0 | 0 |
| 1 | 1 | 1 | 1 | s: Exemplary combination of the CPOL bit and the CPHA bit and corresponding SCLK idle and SCLK stall levels.

Turning to FIG. 3C, FIG. 3C illustrates a specific example where the transfer data is received by the SPI from the peripheral device based on the SPI transmitting a read command to the peripheral device. The operation is similar to that as described with respect to FIGS. 3A and 3B; the details are not repeated here only for brevity. In this example, the SPI stores the following specific values in the registers: the serial clock phase mode (CPHA) bit is set to zero (e.g., configuring the local clock to pulse at the end of each serial bit transfer), the serial clock polarity (CPOL) bit is set to zero (e.g., configuring the local clock to idle at the low voltage level and have an active level of the high voltage level), the transmit byte count (TXBYTES) register is set to zero (e.g., configuring the SPI to transmit 1 byte before reading data from the slave (i.e., TXBYTES+1=0+1)), the transfer byte count (CNT) register is set to 2 (e.g., the predetermined number data samples to collect during a single communication session and configuring the SPI to collect 2 data samples), the read data burst size (RDBURSTSZ) register is set to zero (e.g., configuring the SPI to collect 1 byte bursts (i.e., RDBURSTSZ+1=0+1)), and the wait interval (WAIT_TMR) register is set to 10 (e.g., configuring the SPI to wait for 10 clock cycles of the local timer). The SPI uses the specific values in the registers control the transfer of data. In particular, the SCLK pin 310 idles low (i.e., between times t0 and t1 and, again after time t6) and stall high (i.e., between times t2 and t3 and, again, between times t4 and t5) based on the CPHA bit being set to zero and the CPOL bit being set to zero (e.g., as described with respect to Table 2).

In the example of FIG. 3C, the SPI asserts the CS pin 304 (i.e., at time t1) and transmits (i.e., between times t1 and t2) a single-byte read command (labeled 'Tx0' in FIG. 3C) over the MOSI pin 306. The SPI then stalls for a wait interval of 10 clock cycles (i.e., between times t2 and t3). During the stall, the SCLK pin 310 remains at the high voltage level. When the wait interval ends, the SPI reads a one-byte burst of data (labeled 'Rx0' in FIG. 3C) over the MISO pin 308. The SPI again stalls (with the SCLK pin 310 at the high voltage level) for the wait interval of 10 clock cycles (i.e., between times t4 and t5) before reading a one-byte burst of data (labeled 'Rx1' in FIG. 3C). At time t6, the SPI determines that the value in the sum register (corresponding to two bytes having been read) is equal to the value in the CNT register (corresponding to the predetermined two bytes of data to be read) and ends the SPI frame by transition the CS pin from the active level (i.e., the low voltage) to an inactive level (i.e., the high voltage). A single CS frame includes data collected from multiple reads of data from the peripheral device. The single CS frame begins at time t1 and ends at time t6.

Figure 4:
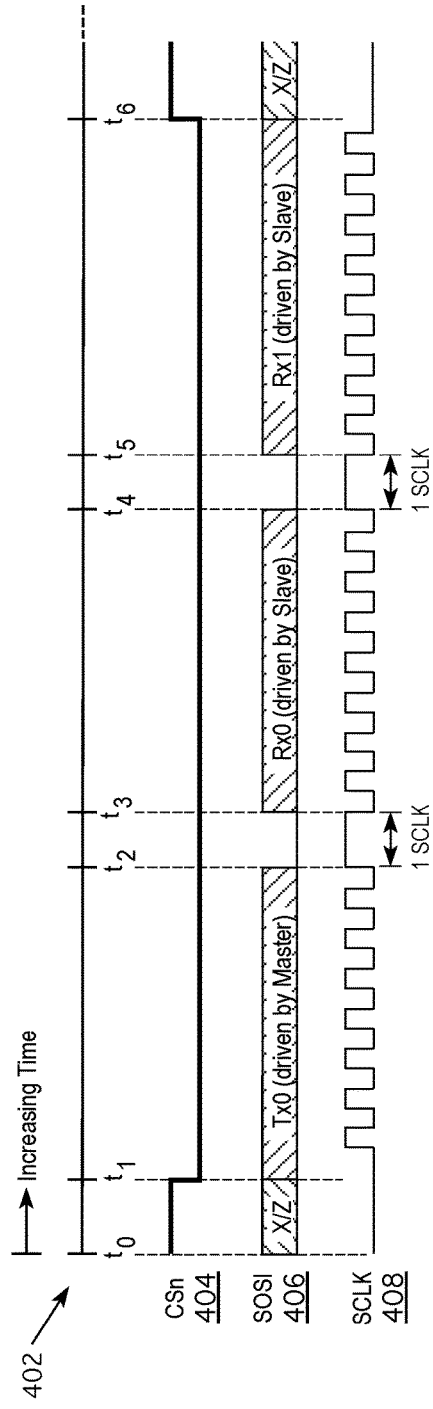
FIG. 4 illustrates signals sent on each pin of a three-pin data communication interface according to some embodiments of the present disclosure.

Turning to FIG. 4, FIG. 4 illustrates signals sent on each pin of a three-pin data communication interface according to some embodiments of the present disclosure. The pins include one or more chip select (CS) pins CSn 404, a slave out/slave in (SOSI) pin 406, and a serial clock (SCLK) pin 408. The SPI includes a local timer (e.g., a serial clock) (not shown) used to generate the clock signals on the SCLK pin 308. The SPI includes an interval timer (e.g., implemented as a timer register) for timing wait intervals between receptions of data (e.g., reads) from the peripheral device. The operation of the three-pin SPI is similar to that of the four-pin SPI as described with respect to FIGS. 3A, 3B, and 3C; the details are not repeated here only for brevity. A difference is that for the three-pin, the data transmission/reception occurs over a single bidirectional pin (i.e., the SOSI pin 406). In this example, the SPI stores the following specific values in the registers: the CPHA bit is set to zero, the CPOL bit is set to zero, the TXBYTES register is set to zero, the CNT register is set to two, the read data burst size (RDBURSTSZ) register is set to zero, and the WAIT_TMR register is set to one.

In the example of FIG. 4, the SPI asserts the CS pin 404 (i.e., at time t1) and transmits (i.e., between times t1 and t2) a single-byte read command (labeled 'Tx0' in FIG. 3C) over the SOSI pin 406. The SPI then stalls for a wait interval of one clock cycle (i.e., between times t2 and t3). During the stall, the SCLK pin 408 remains at the high voltage level. When the wait interval ends, the slave peripheral device transmits a one-byte burst of data (labeled 'Rx0' in FIG. 4) to the SPI over the SOSI pin 406. The SPI again stalls (with the SCLK pin 408 at the high voltage level) for the wait interval of 1 clock cycle (i.e., between times t4 and t5). At time t5, the slave peripheral device transmits a one-byte burst of data (labeled 'Rx1' in FIG. 4). At time t6, the SPI determines that the value in the sum register (corresponding to two bytes having been read) is equal to the value in the CNT register (corresponding to the predetermined two bytes of data to be read) and ends the SPI frame by transition the CS pin from the active level (i.e., the low voltage) to an inactive level (i.e., the high voltage). A single CS frame includes data collected from multiple reads of data from the peripheral device. The single CS frame begins at time t1 and ends at time t6.

Figure 5:
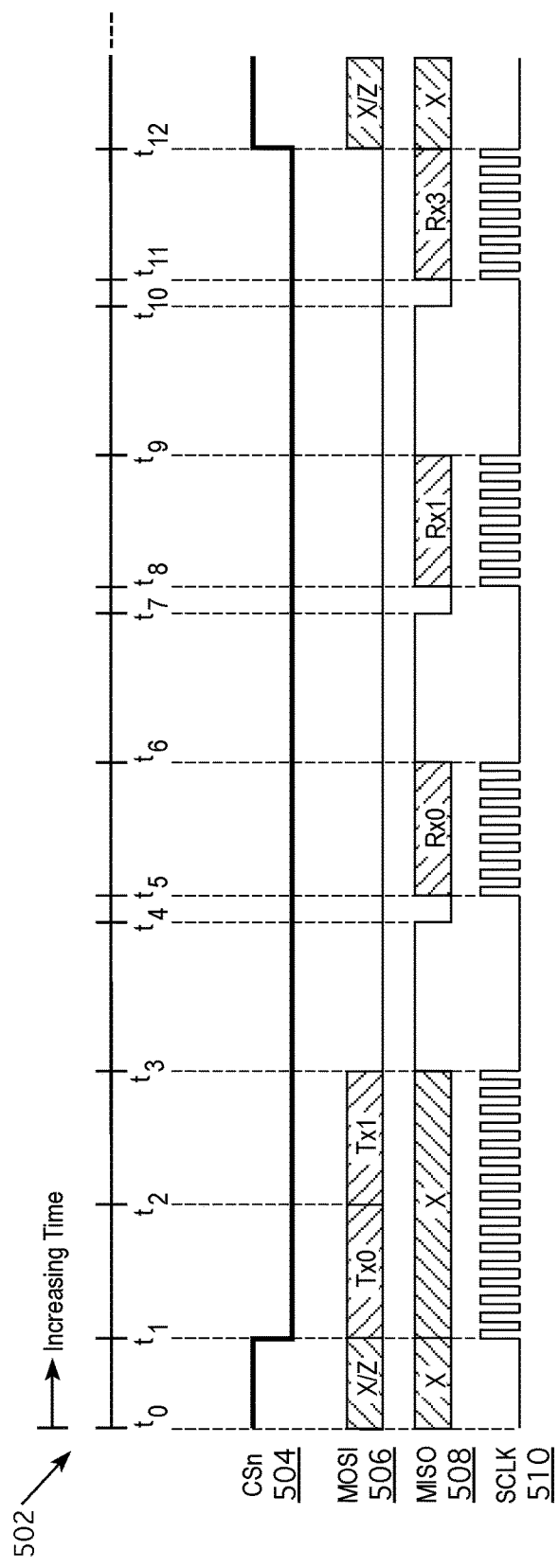
FIG. 5 illustrates signals sent on each pin of a four-pin data communication interface according to some embodiments of the present disclosure.

Each of the examples of FIGS. 3A-3C and 4 illustrate examples where the operational mode of the SPI is the timer mode. In the example of FIG. 5, the operational mode of the SPI is the interrupt mode (e.g., based on detecting an active level on a pin).

Turning to FIG. 5, FIG. 5 illustrates signals sent on each pin of a four-pin data communication interface according to some embodiments of the present disclosure. The operation of the four-pin SPI in FIG. 5 is similar to that of the four-pin SPI as described with respect to FIGS. 3A, 3B, and 3C; the details are not repeated here only for brevity. The pins 504, 506, 508, and 510 correspond to the pins 404, 406, 408, and 410, respectively. In this example, the SPI stores the following specific values in the registers: the CPHA bit is set to zero, the CPOL bit is set to zero, the TXBYTES register is set to one (e.g., configuring the SPI to transmit 2 bytes before reading data from the slave (i.e., TXBYTES+1=1+1)), the CNT register is set to three, the read data burst size (RDBURSTSZ) register is set to zero, and a pin identifier identifies the MISO pin 508 as the pin on which to interrupt when an active level is detected.

In the example of FIG. 5, the SPI asserts the CS pin 504 (i.e., at time t1) and transmits two bytes (e.g., a command and an address) to the salve over the MOSI pin 306. The first byte is transmitted between times t1 and t2. The second byte is transmitted between times t2 and t3. The SPI then stalls at time t3 to wait for an active level on the MISO pin 508. During the interval between times t3 and t4, the MISO pin 508 is at an inactive level (i.e., idles high). At time t4, the slave begins transmitting an active signal to the SPI (i.e., active low such as no voltage) over the MISO pin 508. The SPI detects a trigger condition by detecting the active level on the MISO pin 508. In response to detecting the trigger condition, the SPI reads data from the slave. During the interval between times t5 time t6, the SPI reads one byte of data (labeled 'Rx0' FIG. 5) from the slave over the MISO pin 508. The SPI again stalls at time t6 to wait for an active level on the MISO pin 508. During the interval between times t6 and t7, the MISO pin 508 is at an inactive level. At time t7, the slave begins transmitting an active signal to the SPI (i.e., active low such as no voltage) over the MISO pin 508. During the interval between times t8 time t9, the SPI reads one byte of data (labeled 'Rx1' FIG. 5) from the slave over the MISO pin 508. This process of waiting for the active level on the MISO pin and reading data is repeated between times t9 and t12. At time t12, the SPI determines that the value in the sum register (corresponding to three bytes having been read) is equal to the value in the CNT register (corresponding to the predetermined three bytes of data to be read) and ends the SPI frame by transition the CS pin from the active level (i.e., the low voltage) to an inactive level (i.e., the high voltage). A single CS frame includes data collected from multiple reads of data from the peripheral device. The single CS frame begins at time t1 and ends at time t12.

In the examples in FIGS. 3A-3C, 4, and 5, the chip select pin (CSn) remains in an active state (in this case the low state is the active state) while the master (e.g., the SPI) transmits a single read command (and in some cases an address corresponding to the read command) to the slave (e.g., a selected peripheral device, a selected sensor, and the like) and the master receives from the slave a predetermined number of sensor values (e.g., based on a CNT register). The values may be collected from a register in the sensor whether from consecutive or non-consecutive positions in the register. In addition, the values may be read, from the register, by repeatedly retrieving updated values for adding to the sensor values from at least one position in the register. For example, as the sensor detects updated sensor values, the updated values are successively placed into positions in the register. The chip select may remain active while retrieving updated values from the same position in the register multiple times.

Figure 6:
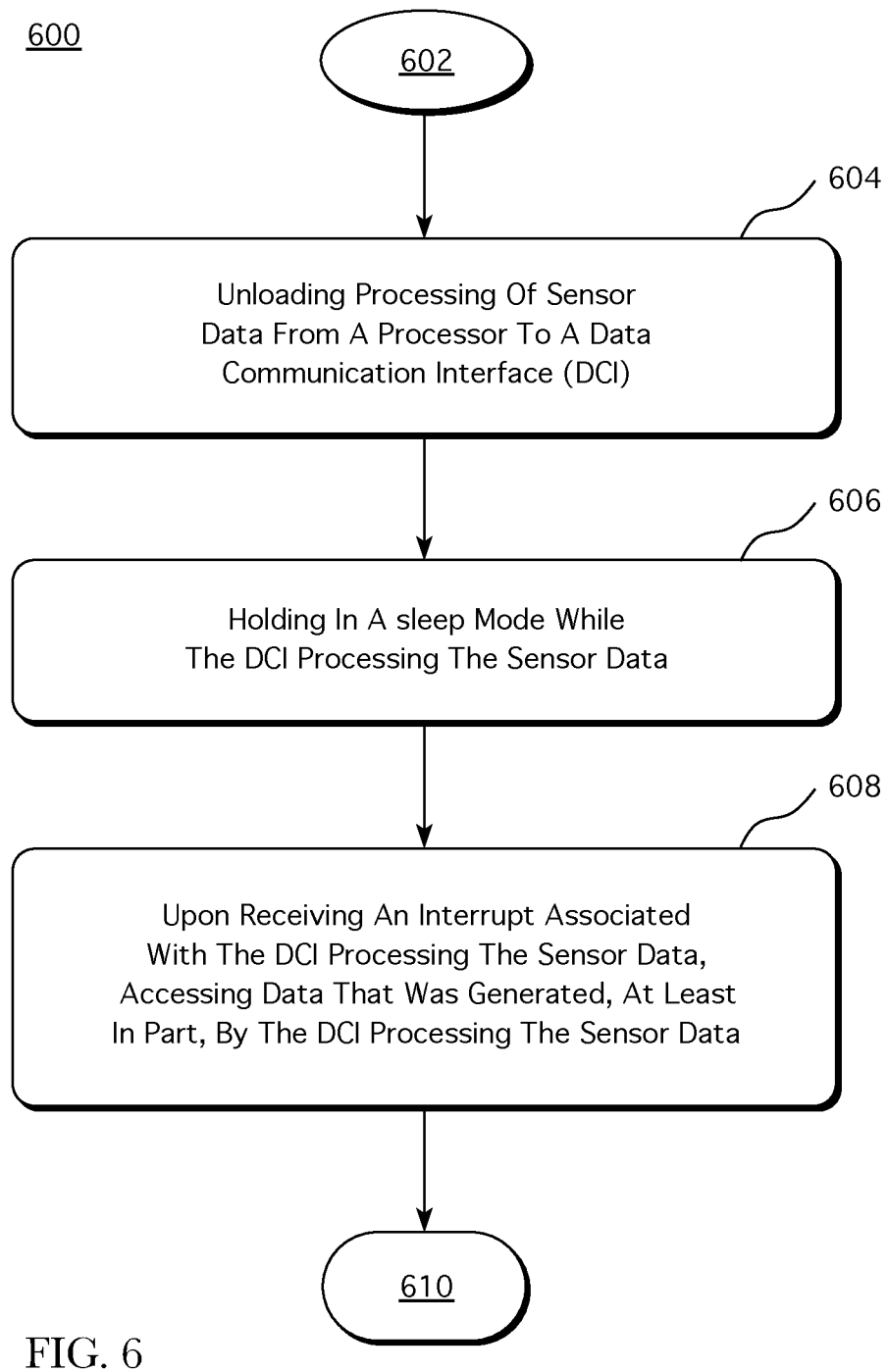
FIG. 6 illustrates an exemplary logic for execution by a microprocessor operable to communicate with a data communication interface, according to some embodiments of the present disclosure.

FIG. 6 illustrates an exemplary logic (i.e., logic 600) for communicating with a data communication interface, according to some embodiments of the present disclosure. Procedure 602 may coincide with a start or end point of other logic, routines, and/or applications. In addition, at 602, data (e.g., objects, values, variables, etc.) may be initialized, retrieved, or accessed for use in logic 600. At 604, the microprocessor unloads processing of sensor data to the data communication interface. The microprocessor can unload the processing by configuring other hardware components to perform the processing (e.g., data collection and/or pre-processing) of the sensor data. For example, the microprocessor may configure the operation of a DMA controller and/or a data communication interface (DCI). Such configuration may comprise setting register values for controlling operation of data processing and/or data collection by the DCI while the microprocessor is later asleep. The microprocessor can program a local timer and/or an interval timer in the DCI. Such programming can comprise setting (e.g., in a register) a wait interval, a clock frequency of the timer, or any other value controlling operation of the local timer and/or the interval timer. When the configuration is complete, microprocessor can instruct the DCI to collect and process the sensor data retrieved by the DCI from the sensors. At 606, the microprocessor holds in a sleep mode while the data communication interface processes the sensor data. The microprocessor enters a sleep mode and remains in the sleep mode until an interrupt is received from the DCI. At 608, upon receiving an interrupt associated with the processing of the data by the data communication interface, accessing data (e.g., processed data) that was generated, at least in part, by the data communication interface processing the sensor data. For example, the microprocessor retrieves the processed data (i.e., data that was pre-processed by the DCI) from the DCI. The microprocessor may then perform further processing or execution of functions or algorithms on the processed data. The logic 600 ends at 610. 610 may coincide with a start or end point of other logic, routines, and/or applications.

Logic 600 may be implemented in a component or combination of components of systems 100 and/or 800. For example, the microprocessor 110 (in system 100 of FIG. 1) may execute logic 600 to collect data from the sensors (i.e., 104, 106*a-b*, 108) via the data collection interfaces (i.e., 120, 122, 124). As another example, the microprocessor 802 (in system 800 of FIGS. 8A and 8B) may execute logic 600 to collect data from the sensor 810 via the serial peripheral interface 808.

Figure 7:
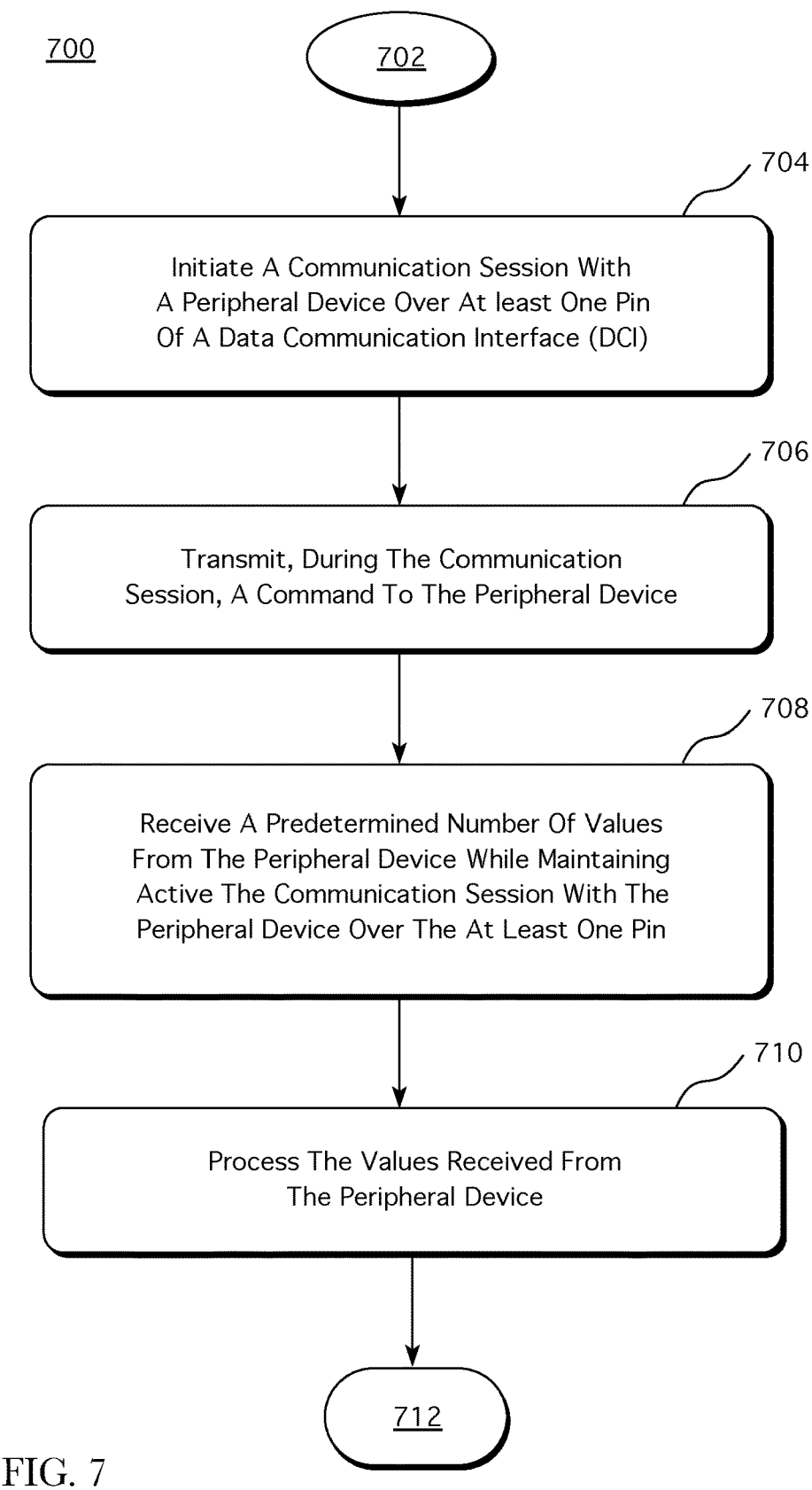
FIG. 7 illustrates an exemplary logic for execution by a data communication interface operable to communicate with a microprocessor, according to some embodiments of the present disclosure.

FIG. 7 illustrates an exemplary logic (logic 700) for execution by a data communication interface operable to communicate with a microprocessor, according to some embodiments of the present disclosure. Procedure 702 may coincide with a start or end point of other logic, routines, and/or applications. In addition, at 702, data (e.g., objects, values, variables, etc.) may be initialized, retrieved, or accessed for use in logic 700. At 704, a communication session is initiated with a peripheral device over at least one pin of the data communication interface (DCI). At 706, a command is transmitted, during the communication session, to the peripheral device. At 708, a predetermined number of values are received from the peripheral device. The predetermined number of values is received while maintaining active the communication session with the peripheral device over the at least one pin. At 710, the values are processed. The logic 700 ends at 712. 712 may coincide with a start or end point of other logic, routines, and/or applications.

Logic 700 may be implemented in a component or combination of components of systems 100 and/or 800. For example, one or more of the data collection interfaces (i.e., 120, 122, 124) (in system 100 of FIG. 1) may execute logic 700 to collect data from the sensors (i.e., 104, 106*a-b*, 108)

while the microprocessor is in a sleep mode. As another example, the serial peripheral interface (SPI) 808 (in system 800 of FIGS. 8A and 8B) may execute logic 600 to collect data from the sensor 810 while the microprocessor 802 is in a sleep mode.

Figure 8A:
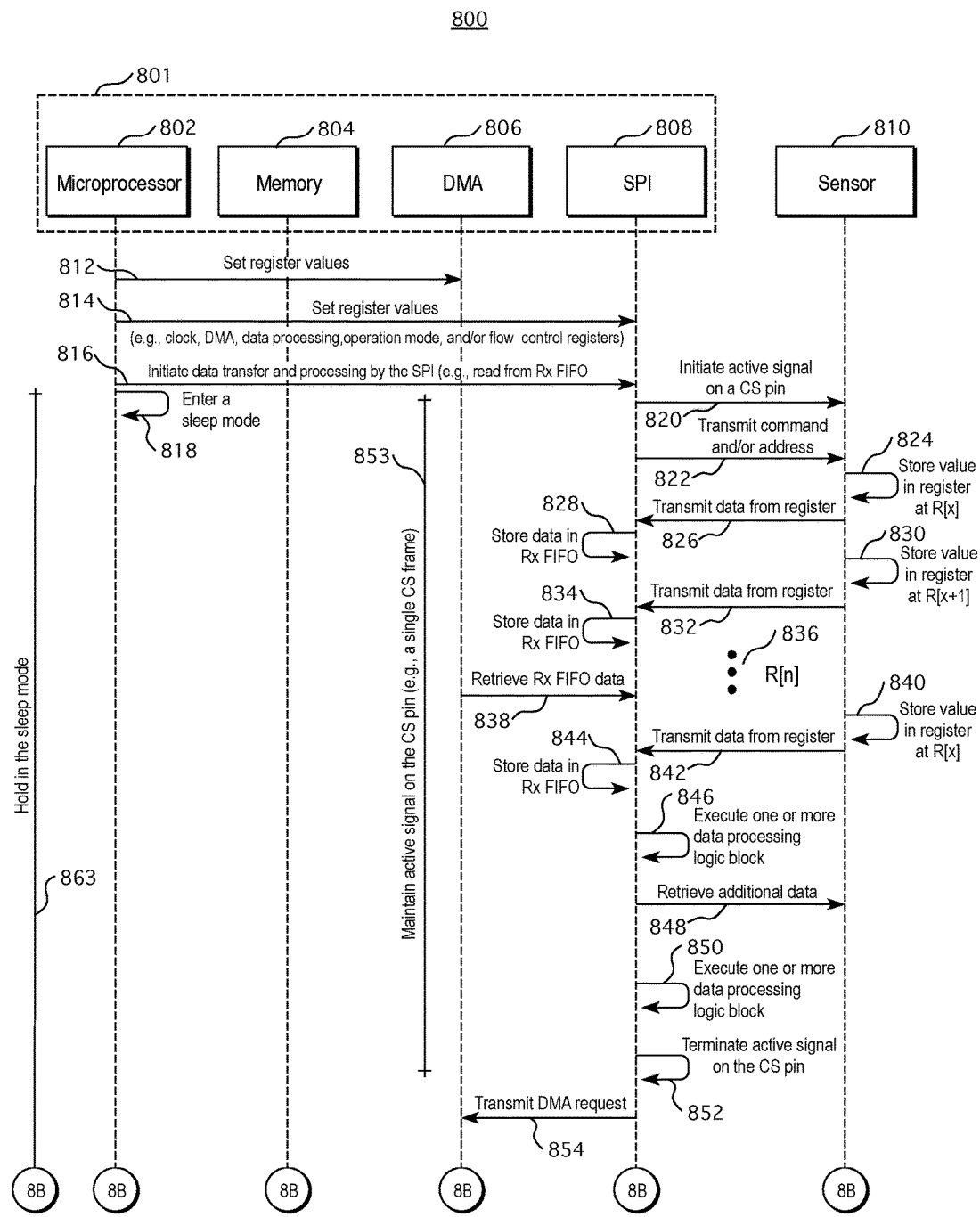
FIGS. 8A and 8B illustrate messages transferred between components on a chip and one or more sensors coupled to the chip.
Figure 8B:
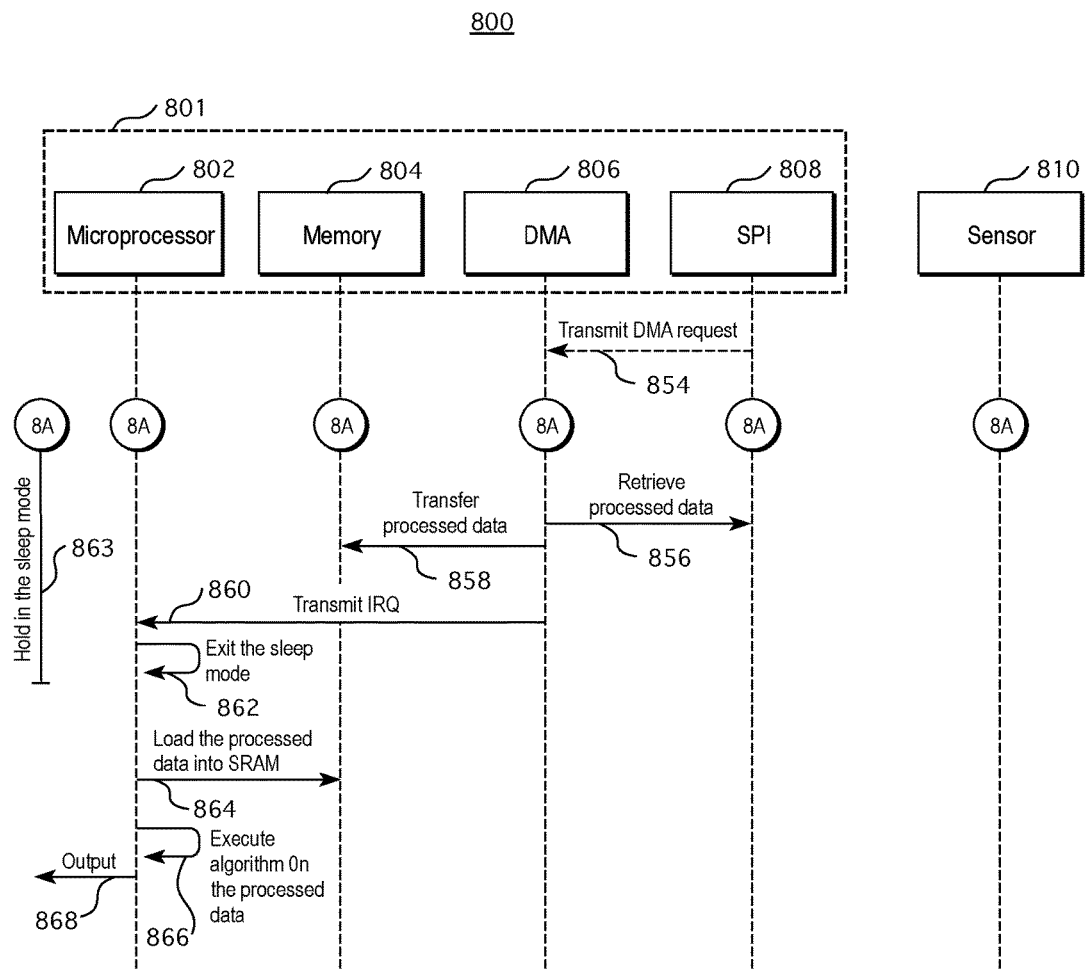

FIGS. 8A and 8B illustrate a system (i.e., system 800) in which data is transferred between components on a chip and one or more sensors coupled to the chip. The data transfer begins on FIG. 8A and continues on FIG. 8B; the labels '8B' in FIG. 8A and the labels '8A' in FIG. 8B mark common reference points between the Figures. System 800 includes chip 801 and a sensor 810 coupled to one another. The chip 801 comprises a microprocessor 802, an on-chip memory 804, a direct memory access (DMA) controller 806, and a serial peripheral interface (SPI) 808. The SPI 808 is data communication interface for transferring data between the microprocessor 802 and the sensor 810. The SPI 808 includes components as described with respect to the data communication interface 200 of FIG. 2 and executes, among other things, the logic 700 of FIG. 7. The microprocessor 802 is operable to execute instructions (e.g., logic 600 of FIG. 6) that, when interrupted by the SPI 808, retrieve processed data generated, at least in part, by the SPI 808. When the amount of data to be retrieved by the DMA controller from the SPI is above a threshold size, the DMA controller 806 transfers the data from a Rx FIFO in the SPI 808 to the memory on-chip memory 804.

At 812, the microprocessor 802 sets register values in the DMA 806.

At 814, the microprocessor 802 sets register values in the SPI 808. For example, the microprocessor 802 may program logic blocks (and/or select logic blocks form a plurality of logic blocks residing in the SPI), set timers, configure state machines, and/or set registers on the SPI 808 before entering a sleep more for an entire duration of the SPI 808 collecting and processing data (e.g., preprocessing) on behalf of the microprocessor 802.

At 816, the microprocessor 802 initiates data transfer and/or processing by the SPI 808. After the initiating, at 818, the microprocessor 802 enters a sleep mode. The microprocessor 802 remains in the sleep mode for the entire duration of the SPI 808 collecting and processing data (e.g., preprocessing) on behalf of the microprocessor 802. While in the sleep mode, a timer—utilized by the v 802 to execute operations—is suspended and, as a result, the microprocessor remains "frozen" in a current state and performs no operations.

In response to receiving the initiation from the microprocessor 802, at 820, the SPI 808 initiates an active signal on a CS pin, which couples the SPI to the sensor 810. The SPI 808 transmits the active signal on the CS pin that corresponds to the sensor 810 to indicate to the sensor 810 that it is a selected sensor (of a potential plurality of sensors).

At 822, the SPI 808 transmits a command and/or an address to the sensor 810 (e.g., over a slave out/slave in (SOSI) pin when the SPI is a three-pin SPI or over a master out/slave in (MOSI) pin when the SPI is a four-pin SPI).

At 824, the sensor 810 stores a value (e.g., a sensor value) in the registers (R) of the sensor. The value is stored in a position x of the register (i.e., R[x]). At 826, the SPI 808 reads data (e.g., comprising the value in the position R[x]) from the sensor register. At 828, the SPI 808 stores the data in a receive first in first out buffer (Rx FIFO).

At 830, the sensor 810 stores another value in the registers in a position x+1 of the register (i.e., R[x+1]). At 832, the SPI 808 reads data (e.g., comprising the another value in the position R[x+1]) from the sensor register. At 834, the SPI 808 stores the data in the Rx FIFO.

At 836, the process of the sensor generating and storing values and the SPI retrieving the data from the sensor repeats any number of times. In this example, the repeats a number of times that repeatedly fills the entire register and the data retrieved by the SPI. The register (R) in the sensor contains n number of positions in which to store data (e.g., the first position is R[1] and the last position is R[n]). During the repeated data storing by the sensor, each position of the register is repeatedly updated to store a new value (i.e., each individual position in the register (R[x]) is updated with a new value). Immediately after 836, each position of the register has one value stored in it and the register is full (i.e., each position up to and including position R[n] stores a value newly added by the sensor).

At 838, the DMA controller 806 retrieves data from the Rx FIFO of the SPI 808 (e.g., for storing in a memory element such as memory 804). The DMA controller may repeatedly retrieve data from the SPI 808, which prevents the data from overflowing the Rx FIFO in the SPI.

At 840, the sensor 810 stores another value in the register in the position x of the register (i.e., R[x]). For example, the sensor overwrites the initial sensor value in the position R[x] with a new sensor value. At 842, the SPI 808 reads data (e.g., comprising the another value in the position R[x]) from the sensor register. The position in the register R[x] is repeatedly read (e.g., at 826 and again at 842) to retrieve updated values for adding to the sensor values in the Rx FIFO of the SPI 808. Each of the updated values is successively placed into the position in the register R[x] by the sensor 810 (i.e., the selected sensor). At 844, the SPI 808 stores the data in the Rx FIFO.

At 846, the SPI executes one or more data processing logic blocks on the data retrieved from the sensor 810. The data (retrieved from the sensor 810) may be stored in the Rx FIFO of the SPI 808 or may have been transferred to a different memory (e.g., memory 804) by the DMA controller. The one or more data processing logic blocks (when executed by the SPI) operates on the data retrieved from the sensor 810. The data processing logic block includes instructions, that when executed, process the data (e.g., authenticate, verify, or generate output from the data). For example, the data processing logic block may execute one or more of the following functions on the data: an averaging function, an error detection function, a threshold function, a sensor status check function, a filtering function, a masking function, Fast Fourier transform (FFT), Discrete Fourier transform (DFT), a data pre-conditioning function to prepare the data for further processing by an algorithm to be executed by the microprocessor, and/or an authentication function to verify that the sensor data meets preconditions. Each data processing logic block generates processed data by, e.g., authenticating, verifying, modifying the data, or transforming the data in a manner specified by the settings put in place by the microprocessor (i.e., at 814). In this example, the SPI determines, based on output generated by the one or more data processing logic blocks, that that additional data is required (e.g., when the output identifies that the data do not meet pre-conditions specified by the microprocessor 802). At 848, the SPI retrieves additional data from the sensor (i.e., in a manner similar to that described with respect to any portion of 822 through 844).

At 850, the SPI executes the one or more data processing logic blocks on the additional data (and/or a combination of the data and the additional data) retrieved from the sensor 810. Again, the one or more data processing logic blocks generates output (i.e., indications regarding conditions and/or processed data). When the SPI determines that the additional data (and/or the combination of the data and the additional data) meets conditions specified by the microprocessor in the registers of the SPI, the SPI terminates a communication session with the sensor 810. At 852, the SPI terminates the communication session with the sensor 810 by terminating the transmission of the active signal on the CS pin of the SPI (e.g., and initiating sending no signal or the inactive signal on the CS pin).

The SPI maintained the active signal on the CS pin for the duration of the data transfer from the sensor and the subsequent processing of the data, as generally indicated by 853.

At 854, the SPI transmits a DMA request to the DMA controller 806. In some examples, the DMA request is an active signal that sent over a DMA specific communications media (e.g., a wire). The receipt of the DMA request may trigger the DMA controller to access, from a memory element, a pointer to an address at which the processed data (or the original data) is stored. Turning to FIG. 8B, 854 is repeated on FIG. 8B only as a reference.

At 856, the DMA retrieves the processed data from the SPI 808. At 858, the DMA transfers the processed data to the on-chip memory 804. At 860, the DMA transmits an interrupt request (IRQ) to the microprocessor 802. The IRQ interrupts the microprocessor 802 from the sleep mode. At 862, the microprocessor 802 exits the sleep mode (in response to the IRQ). The microprocessor 802 remained in the sleep mode for the entire duration of the SPI 808 collecting and processing data (i.e., from 816 through 860) on behalf of the microprocessor 802, as generally indicated by 863.

In some examples, the DMA controller 806 retrieves the data, transfers the data, and generates the IRQ in response to the DMA request (i.e., transmitted by the SPI to the DMA at 854). Thus, the microprocessor 802 is interrupted based, at least in part, on the request generated and transmitted by the SPI. In other example, the SPI 808 directly interrupts the microprocessor (e.g., by transmitting an IRQ to the microprocessor after transferring the processed data to the memory).

At 864, the microprocessor 802 loads the processed data into a static random-access memory (SRAM) of the microprocessor 802. At 866, the microprocessor 802 executes an algorithm on the processed data (using, at least in part, the processed data loaded in the SRAM) and generates an output. At 868, the microprocessor 802 transmits output to another element.

In the discussions of the embodiments and/or examples above, the specific units of measure and/or specific numbers of units (e.g., a specific number of bits and/or bytes) are given only as examples. The teachings of the present disclosure are not limited to such embodiments and/or examples. In other embodiments and/or examples, the units of measure and numbers may be replaced by other units/number (e.g., kilobits, megabits, gigabits, etc.; or kilobytes, megabytes, gigabytes, etc.).

In the discussions of the embodiments above, capacitors, clocks, DFFs, dividers, inductors, resistors, amplifiers, switches, digital core, transistors, and/or other components can readily be added, replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the Figures may be implemented on a board (and/or chip) of an associated electronic device. The board can be a general circuit board that can hold various components of the internal electronic system of the electronic device and, further, provide connectors/interfaces for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits and data communication interfaces of the figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the data processing and/or data transferring functions may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of microprocessors, sensors, registers, logic blocks, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed with reference to the Figures are applicable to any integrated circuits that involve sensor signals and/or signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in technologies for medical imaging, patient monitoring, medical instrumentation, and home healthcare. This could include pulmonary monitors, heart rate monitors, pacemakers, etc. Other applications can involve automotive technologies for safety systems (e.g., providing user input for stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the present disclosure can be used for auto or user assisted focus and image stabilization (e.g., for digital still cameras, camcorders, etc.). Other consumer applications can include interfaces for home theater systems, DVD recorders, and high-definition televisions. Yet other consumer applications can involve advanced input interfaces (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the Figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that all optional features of the apparatus described above may also be implemented with respect to the method or process described herein and specifics in the examples may be used anywhere in one or more embodiments.

The following examples relate to some embodiments of the present disclosure:

Example 1 is a data communication interface for transferring data between a microprocessor and one or more sensors. The data communication interface comprises: at least one pin operably coupled to the microprocessor and the one or more sensors; a sensor register storing a value identifying which of the one or more sensors is a selected sensor for communication over the at least one pin; a state machine configured to generate a read command based on the sensor register, and transmit the read command to the selected sensor; and a flow control logic block configured to, upon detection of a trigger condition, transmit an instruction to the state machine, wherein the state machine is configured to receive, based at least in part on the instruction, a predetermined number of sensor values from the selected sensor while maintaining active a single communication session with the selected sensor over the at least one pin.

In Example 2, the subject matter of Example 1 can optionally include the receiving the predetermined number of sensor values from the selected sensor while maintaining active the single communication session with the selected sensor over the at least one pin comprises: repeatedly reading, from a register, ones of the sensor values based on the read command until the predetermined number of sensor values is reached, wherein at least one position in the register is repeatedly read to retrieve updated values for adding to the sensor values, the updated values being successively placed into the at least one position by the selected sensor.

In Example 3 the subject matter of Example 1 or 2 can optionally include the state machine being operable to transmit processed data to an on-chip memory accessible by the microprocessor, the processed data being generated based at least in part on the sensor values.

In Example 4, the subject matter of any of Examples 1-3 can optionally further comprise: one or more data processing logic blocks coupled to the state machine, each of the one or more data processing logic blocks being operable to generate the processed data by executing a function on the sensor values.

In Example 5, the subject matter of any of Examples 1-4 can optionally include at least one of the one or more data processing logic blocks being associated with a register for storing a criteria value and the function comprises a comparator to compare at least a portion of the sensor values to the criteria value.

In Example 6, the subject matter of any of Examples 1-5 can optionally include the function being selected from the group consisting of: an averaging function, an error detection function, a threshold function, a sensor status check function, a filtering function, a masking function, Fast Fourier transform (FFT), Discrete Fourier transform (DFT), a data pre-conditioning function to prepare the data for further processing by an algorithm to be executed by the microprocessor, and an authentication function to verify that the sensor data meets preconditions.

In Example 7, the subject matter of any of Examples 1-6 can optionally further comprise: a Direct Memory Access (DMA) controller operably coupled to the on-chip memory and the one or more data processing logic blocks, wherein the DMA controller is operable to retrieve the processed data from any of the one or more data processing logic blocks.

In Example 8, the subject matter of any of Examples 1-7 can optionally further comprise: an interrupt request (IRQ) generator operably coupled to the microprocessor and the one or more data processing logic blocks; wherein each of the one or more data processing logic blocks is operable to transmit the processed data to the IRQ generator, and the IRQ generator is operable to generate an interrupt request and transmit the interrupt request to the microprocessor based on the receipt of processed data from any of the one or more data processing logic blocks.

In Example 9, the subject matter of any of Examples 1-8 can optionally further comprise: a state machine register operable to store a mode value corresponding to one or more operational modes of data transfer over the at least one pin, the operational modes comprising a timer mode and an interrupt mode for receiving the sensor values from the selected sensor, wherein the trigger condition corresponds to a selected one of the operational modes.

In Example 10, the subject matter of any of Examples 1-9 can optionally include the data communication interface being a serial interface.

In Example 11, the subject matter of any of Examples 1-10 can optionally include the serial interface being one selected from the group consisting of: a serial peripheral interface (SPI), an Inter-Integrated Circuit (IIC), a 1-Wire bus, and an UNI/O bus.

In Example 12, the subject matter of any of Examples 1-11 can optionally further comprise: a local timer configured to generate clock signals, wherein the serial interface is a serial peripheral interface (SPI), and the at least one pin comprises three or more pins, the three or more pins comprising: at least one chip select pin operable to identify, based on a low signal or a high signal, the selected sensor, at least one data transfer pin operable to transmit data to and/or receive data from the selected sensor, and a clock pin operable to transmit clock signals to the selected sensor; and wherein the maintaining active the single communication session with the selected sensor over the at least one pin comprises maintaining the least one chip select pin at an active level.

In Example 13, the subject matter of any of Examples 1-12 can optionally further comprise: an interval timer configured to count a wait interval of clock cycles of the local timer, wherein the flow control logic block detecting the trigger condition comprises the flow control logic block detecting an expiration of the wait interval of the local timer based on the interval timer.

In Example 14, the subject matter of any of Examples 1-13 can optionally include the flow control logic block detecting the trigger condition comprises the flow control logic block detecting an active power level on the at least one pin.

In Example 15, the subject matter of any of Examples 1-14 can optionally further comprise: a general-purpose input/output (GPIO) pin coupled to the data communication interface, wherein the flow control logic block detecting the trigger condition comprises the data communication interface detecting an active level in the GPIO pin.

In Example 16, the subject matter of any of Examples 1-15 can optionally include each of the one or more data processing logic blocks being associated with at least one of the one or more sensors.

Example 17 is a system comprising: a microprocessor; one or more sensors; and a data communication interface comprising: at least one pin operably coupled to the microprocessor and the one or more sensors; a sensor register storing a value identifying which of the one or more sensors is a selected sensor for communication over the at least one pin; and a state machine configured to generate a read command based on the sensor register, and transmit the read command to the selected sensor; and a flow control logic block configured to, upon detection of a trigger condition, transmit an instruction to the state machine, wherein the state machine is configured to receive, based at least in part on the instruction, a predetermined number of sensor values from the selected sensor while maintaining active a single communication session with the selected sensor over the at least one pin.

In Example 18, the subject matter of Example 1 can optionally include the receiving the predetermined number of sensor values from the selected sensor while maintaining active the single communication session with the selected sensor over the at least one pin comprising: repeatedly reading, from a register, ones of the sensor values based on the read command until the predetermined number of sensor values is reached, wherein at least one position in the register is repeatedly read to retrieve updated values for adding to the sensor values, the updated values being successively placed into the at least one position by the selected sensor.

In Example 19, the subject matter of Example 17 or 18 can optionally further comprise: an on-chip memory accessible by the microprocessor, wherein the state machine is operable to transmit processed data to the on-chip memory, the processed data being generated based at least in part on the sensor values.

In Example 20, the subject matter of any of Examples 17-19 can optionally include wherein the data communication interface further comprising: one or more data processing logic blocks coupled to the state machine, each of the one or more data processing logic blocks being operable to generate the processed data by executing a function on the sensor values.

In Example 21, the subject matter of any of Examples 17-20 can optionally include at least one of the one or more data processing logic blocks being associated with a register for storing a criteria value and the function comprises a comparator to compare at least a portion of the sensor values to the criteria value.

In Example 22, the subject matter of any of Examples 17-21 can optionally include the function being selected from the group consisting of: an averaging function, an error detection function, a threshold function, a sensor status check function, a filtering function, a masking function, Fast Fourier transform (FFT), Discrete Fourier transform (DFT), and/or a data pre-conditioning function to prepare the data for further processing by an algorithm to be executed by the microprocessor.

In Example 23, the subject matter of any of Examples 17-22 can optionally further comprise: a Direct Memory Access (DMA) controller operably coupled to the on-chip memory and the one or more data processing logic blocks, wherein the DMA controller is operable to retrieve the processed data from any of the one or more data processing logic blocks.

In Example 24, the subject matter of any of Examples 17-23 can optionally include the data communication interface further comprising: an interrupt request (IRQ) generator operably coupled to the microprocessor and the one or more data processing logic blocks; wherein each of the one or more data processing logic blocks is operable to transmit the processed data to the IRQ generator, and the IRQ generator is operable to generate an interrupt request and transmit the interrupt request to the microprocessor based on the receipt of processed data from any of the one or more data processing logic blocks.

In Example 25, the subject matter of any of Examples 17-24 can optionally include the data communication interface further comprising: a state machine register operable to store a mode value corresponding to one or more operational modes of data transfer over the at least one pin, the operational modes comprising a timer mode and an interrupt mode for receiving the sensor values from the selected sensor, wherein the trigger condition corresponds to a selected one of the operational modes.

In Example 26, the subject matter of any of Examples 17-25 can optionally include the data communication interface being a serial interface.

In Example 27, the subject matter of any of Examples 17-26 can optionally include the serial interface being one selected from the group consisting of: a serial peripheral interface (SPI), an Inter-Integrated Circuit (IIC), a 1-Wire bus, and an UNI/O bus.

In Example 28, the subject matter of any of Examples 17-27 can optionally include the data communication interface further comprising: a local timer operable to generate clock signals; and wherein the serial interface is a serial peripheral interface (SPI), and the at least one pin comprises three or more pins, the three or more pins comprising: at least one chip select pin operable to identify, based on a low signal or a high signal, the selected sensor, at least one data transfer pin operable to transmit data to and/or receive data from the selected sensor, and a clock pin operable to transmit clock signals to the selected sensor; and wherein the maintaining active the single communication session with the selected sensor over the at least one pin comprises maintaining the least one chip select pin at an active level.

In Example 29, the subject matter of any of Examples 17-28 can optionally include the data communication interface further comprising: an interval timer configured to count a wait interval of clock cycles of the local timer, wherein the flow control logic block detecting the trigger condition comprises the flow control logic block detecting an expiration of the wait interval of the local timer based on the interval timer.

In Example 30, the subject matter of any of Examples 17-29 can optionally include the flow control logic block detecting the trigger condition comprising the flow control logic block detecting an active power level on the at least one pin.

In Example 31, the subject matter of any of Examples 17-30 can optionally further comprise: a general-purpose input/output (GPIO) pin coupled to the data communication interface, wherein the flow control logic block detecting the trigger condition comprises the data communication interface detecting an active level in the GPIO pin.

In Example 32, the subject matter of any of Examples 17-31 can optionally each of the one or more data processing logic blocks being associated with at least one of the one or more sensors.

Example 33 is a method for transferring data between a microprocessor and one or more sensors. The method comprises: retrieving, from a sensor register, a value identifying which of the one or more sensors is a selected sensor for communication over at least one pin, the at least one pin being operably coupled to the microprocessor and the one or more sensors; generating a read command based on the sensor register; upon detection of the trigger condition, transmitting the read command to the selected sensor; and receiving, from the selected sensor, a predetermined number of sensor values, wherein the predetermined number of sensor values is received while maintaining active a single communication session with the selected sensor over the at least one pin.

In Example 34, the subject matter of Example 33 can optionally include the receiving the predetermined number of sensor values from the selected sensor while maintaining active the single communication session with the selected sensor over the at least one pin comprising: repeatedly reading, from a register, ones of the sensor values based on the read command until the predetermined number of sensor values is reached, wherein at least one position in the register is repeatedly read to retrieve updated values for adding to the sensor values, the updated values being successively placed into the at least one position by the selected sensor.

In Example 35, the subject matter of Example 33 or 34 can optionally further comprise: transmitting processed data to an on-chip memory, the processed data being generated based at least in part on the sensor values, wherein the on-chip memory is accessible by the microprocessor.

In Example 36, the subject matter of any of Examples 33-35 can optionally further comprise generating the processed data by executing a function on the sensor values.

In Example 37, the subject matter of any of Examples 33-36 can optionally further comprise storing a criteria value in a register, and wherein the function comprises a comparator to compare at least a portion of the sensor values to the criteria value.

In Example 38, the subject matter of any of Examples 33-37 can optionally include the function being selected from the group consisting of: an averaging function, an error detection function, a threshold function, a sensor status check function, a filtering function, a masking function, Fast Fourier transform (FFT), Discrete Fourier transform (DFT), and/or a data pre-conditioning function to prepare the data for further processing by an algorithm to be executed by the microprocessor.

In Example 39, the subject matter of any of Examples 33-38 can optionally further comprise: transferring the processed data to a Direct Memory Access (DMA) controller, wherein the DMA controller is operably coupled to the on-chip memory and one or more data processing logic blocks.

In Example 40, the subject matter of any of Examples 33-39 can optionally further comprise: transferring the processed data to an interrupt request (IRQ) generator, wherein the IRQ generator is operably coupled to the microprocessor and one or more data processing logic blocks and, wherein the IRQ generator is operable to generate an interrupt request and transmit the interrupt request to the microprocessor based on the receipt of processed data from any of the one or more data processing logic blocks.

In Example 41, the subject matter of any of Examples 33-40 can optionally further comprise: storing, in a flow control register, a mode value corresponding to one or more operational modes of data transfer over the at least one pin, the operational modes comprising a timer mode and an interrupt mode for receiving the sensor values from the selected sensor, wherein the trigger condition corresponds to a selected one of the operational modes.

In Example 42, the subject matter of any of Examples 33-41 can optionally include the method being implemented by a serial interface.

In Example 43, the subject matter of any of Examples 33-42 can optionally include the serial interface being one selected from the group consisting of: a serial peripheral interface (SPI), an Inter-Integrated Circuit (IIC), a 1-Wire bus, and an UNI/O bus.

In Example 44, the subject matter of any of Examples 33-43 can optionally further comprise generating, by a timer, clock signals, and wherein the serial interface is a serial peripheral interface (SPI), and the at least one pin comprises three or more pins, the three or more pins comprising: at least one chip select pin operable to identify, based on a low signal or a high signal, the selected sensor, at least one data transfer pin operable to transmit data to and/or receive data from the selected sensor, and a clock pin operable to transmit clock signals to the selected sensor; and wherein the maintaining active the single communication session with the selected sensor over the at least one pin comprises maintaining the least one chip select pin at an active level.

In Example 45, the subject matter of any of Examples 33-44 can optionally include the detecting the trigger condition comprising detecting an expiration of a wait interval of the timer.

In Example 46, the subject matter of any of Examples 33-45 can optionally include the detecting the trigger condition comprising detecting an active power level on the at least one pin.

In Example 47, the subject matter of any of Examples 33-46 can optionally include the detecting the trigger condition comprising detecting an active level in a general-purpose input/output (GPIO).

In Example 48, the subject matter of any of Examples 33-47 can optionally include the generating the processed data by executing the function on the sensor values being executed for each of the one or more sensors.

Example 49 is a system for transferring data between a microprocessor and one or more sensors. The system can include any suitable circuitry, dividers, capacitors, resistors, inductors, ADCs, DFFs, logic gates, software, hardware, links, etc. that can be part of any type of computer, which can further include a circuit board, coupled to a plurality of electronic components. The system comprises: means for retrieving, from a sensor register, a value identifying which of the one or more sensors is a selected sensor for communication over at least one pin, the at least one pin being operably coupled to the microprocessor and the one or more sensors; means for generating a read command based on the sensor register and detection of a trigger condition; means for, upon detection of the trigger condition, transmitting the read command to the selected sensor; and means for receiving, from the selected sensor, a predetermined number of sensor values, wherein the predetermined number of sensor values is received while maintaining active a single communication session with the selected sensor over the at least one pin.

In Example 50, the subject matter of Example 49 can optionally include the means for receiving the predetermined number of sensor values from the selected sensor while maintaining active the single communication session with the selected sensor over the at least one pin comprising: means for repeatedly reading, from a register, ones of the sensor values based on the read command until the predetermined number of sensor values is reached, wherein at least one position in the register is repeatedly read to retrieve updated values for adding to the sensor values, the updated values being successively placed into the at least one position by the selected sensor.

In Example 51, the subject matter of Example 49 or 50 can optionally further comprise: means for transmitting processed data to an on-chip memory, the processed data being generated based at least in part on the sensor values, wherein the on-chip memory is accessible by the microprocessor.

In Example 52, the subject matter of any of Examples 49-51 can optionally further comprise means for generating the processed data by executing a function on the sensor values.

In Example 53, the subject matter of any of Examples 49-52 can optionally further comprise means for storing a criteria value in a register, and wherein the function comprises a comparator to compare at least a portion of the sensor values to the criteria value.

In Example 54, the subject matter of any of Examples 49-53 can optionally include the function being selected from the group consisting of: an averaging function, an error detection function, a threshold function, a sensor status check function, a filtering function, a masking function, Fast Fourier transform (FFT), Discrete Fourier transform (DFT), and/or a data pre-conditioning function to prepare the data for further processing by an algorithm to be executed by the microprocessor.

In Example 55, the subject matter of any of Examples 49-54 can optionally further comprise: means for transferring the processed data to a Direct Memory Access (DMA) controller, wherein the DMA controller is operably coupled to the on-chip memory and one or more data processing logic blocks.

In Example 56, the subject matter of any of Examples 49-55 can optionally further comprise: means for transferring the processed data to an interrupt request (IRQ) generator, wherein the IRQ generator is operably coupled to the microprocessor and one or more data processing logic blocks and, wherein the IRQ generator is operable to generate an interrupt request and transmit the interrupt request to the microprocessor based on the receipt of processed data from any of the one or more data processing logic blocks.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In Example 57, the subject matter of any of Examples 49-56 can optionally further comprise: storing, in a flow control register, a mode value corresponding to one or more operational modes of data transfer over the at least one pin, the operational modes comprising a timer mode and an interrupt mode for receiving the sensor values from the selected sensor, wherein the trigger condition corresponds to a selected one of the operational modes.

In Example 58, the subject matter of any of Examples 49-57 can optionally include the method being implemented by a serial interface.

In Example 59, the subject matter of any of Examples 49-58 can optionally include the serial interface being one selected from the group consisting of: a serial peripheral interface (SPI), an Inter-Integrated Circuit (IIC), a 1-Wire bus, and an UNI/O bus.

In Example 60, the subject matter of any of Examples 49-59 can optionally further comprise generating, by a timer, clock signals, and wherein the serial interface is a serial peripheral interface (SPI), and the at least one pin comprises three or more pins, the three or more pins comprising: at least one chip select pin operable to identify, based on a low signal or a high signal, the selected sensor, at least one data transfer pin operable to transmit data to and/or receive data from the selected sensor, and a clock pin operable to transmit clock signals to the selected sensor; and wherein the maintaining active the single communication session with the selected sensor over the at least one pin comprises maintaining the least one chip select pin at an active level.

In Example 61, the subject matter of any of Examples 49-60 can optionally include the detecting the trigger condition comprising detecting an expiration of a wait interval of the timer.

In Example 62, the subject matter of any of Examples 49-61 can optionally include the detecting the trigger condition comprising detecting an active power level on the at least one pin.

In Example 63, the subject matter of any of Examples 49-62 can optionally include the detecting the trigger condition comprising detecting an active level in a general-purpose input/output (GPIO).

In Example 64, the subject matter of any of Examples 49-63 can optionally include the generating the processed data by executing the function on the sensor values being executed for each of the one or more sensors.

What is claimed is:

1. A data communication interface for transferring data between a microprocessor and one or more sensors, the data communication interface comprising:
    at least one pin of one or more pins operably coupled to the microprocessor and the one or more sensors;
    a sensor register storing a value identifying which of the one or more sensors is a selected sensor for communication over the at least one pin;
    a state machine configured to generate a read command based on the sensor register, and transmit the read command to the selected sensor; and
    a flow control logic block configured to, upon detection of a trigger condition, transmit an instruction to the state machine, wherein the state machine is configured to receive, based at least in part on the instruction, a predetermined number of sensor values from the selected sensor while maintaining active a single communication session with the selected sensor over the at least one pin, and wherein the flow control logic block is operable to transmit processed data to an on-chip memory accessible by the microprocessor, the processed data being generated based at least in part on the sensor values.

2. The data communication interface of claim 1, wherein the receiving the predetermined number of the sensor values from the selected sensor while maintaining active the single communication session with the selected sensor over the at least one pin comprises:
    repeatedly reading, from a register, ones of the sensor values based on the read command until the predetermined number of the sensor values is reached, wherein at least one position in the register is repeatedly read to retrieve updated values for adding to the sensor values, the updated values being successively placed into the at least one position by the selected sensor.

3. The data communication interface of claim 1, further comprising:
    one or more data processing logic blocks coupled to the flow control logic block, each of the one or more data processing logic blocks being operable to generate the processed data by executing a function on the sensor values.

4. The data communication interface of claim 3, wherein at least one of the one or more data processing logic blocks is associated with a register for storing a criteria value and the function comprises a comparator to compare at least a portion of the sensor values to the criteria value.

5. The data communication interface of claim 3, further comprising:
    an interrupt request (IRQ) generator operably coupled to the microprocessor and the one or more data processing logic blocks;
    wherein each of the one or more data processing logic blocks is operable to transmit the processed data to the IRQ generator; and
    wherein the IRQ generator is operable to generate an interrupt request and transmit the interrupt request to the microprocessor based on the receipt of the processed data from any of the one or more data processing logic blocks.

6. The data communication interface of claim 1, further comprising:
    a flow control register operable to store a mode value corresponding to one or more operational modes of data transfer over the at least one pin, the one or more operational modes comprising a timer mode and an interrupt mode for receiving the sensor values from the selected sensor, wherein the trigger condition corresponds to a selected one of the one or more operational modes.

7. The data communication interface of claim 1, wherein the data communication interface is a serial interface.

8. The data communication interface of claim 7, further comprising:
    a local timer configured to generate clock signals; and
    wherein the serial interface is a serial peripheral interface (SPI), and the at least one pin of the one or more pins comprises three or more pins, the three or more pins comprising:
        at least one chip select pin operable to identify, based on a low signal or a high signal, the selected sensor,
        at least one data transfer pin operable to transmit data to and/or receive data from the selected sensor, and
        a clock pin operable to transmit the clock signals to the selected sensor; and
    wherein the maintaining active the single communication session with the selected sensor over the at least one pin comprises maintaining the at least one chip select pin at an active level.

9. The data communication interface of claim 8, further comprising:
    an interval timer configured to count a wait interval of the clock signals of the local timer, wherein the flow control logic block detecting the trigger condition comprises the flow control logic block detecting an expiration of the wait interval of the local timer based on the interval timer.

10. A method for transferring data between a microprocessor and one or more sensors, the method comprising:
retrieving, from a sensor register, a value identifying which of the one or more sensors is a selected sensor for communication over at least one pin, the at least one pin being operably coupled to the microprocessor and the one or more sensors;
generating a read command based on the sensor register and transmitting the read command to the selected sensor;
upon detection of a trigger condition, receiving, from the selected sensor, a predetermined number of sensor values, wherein the predetermined number of the sensor values is received while maintaining active a single communication session with the selected sensor over the at least one pin; and
transmitting processed data to an on-chip memory, the processed data being generated based at least in part on the sensor values, wherein the on-chip memory is accessible by the microprocessor.

11. The method of claim 10, wherein the receiving the predetermined number of the sensor values from the selected sensor while maintaining active the single communication session with the selected sensor over the at least one pin comprises:
repeatedly reading, from a register, ones of the sensor values based on the read command until the predetermined number of the sensor values is reached, wherein at least one position in the register is repeatedly read to retrieve updated values for adding to the sensor values, the updated values being successively placed into the at least one position by the selected sensor.

12. The method of claim 10, further comprising generating the processed data by executing a function on the sensor values.

13. The method of claim 12, further comprising storing a criteria value in a register, and wherein the function comprises a comparator to compare at least a portion of the sensor values to the criteria value.

14. The method of claim 12, further comprising:
transferring the processed data to an interrupt request (IRQ) generator, wherein the IRQ generator is operably coupled to the microprocessor and one or more data processing logic blocks and,
generating, by the IRQ generator, an interrupt request and transmitting the interrupt request to the microprocessor based on receipt of the processed data from any of the one or more data processing logic blocks.

15. The method of claim 10, further comprising:
storing a mode value corresponding to one or more operational modes of data transfer over the at least one pin, the one or more operational modes comprising a timer mode and an interrupt mode for receiving the sensor values from the selected sensor, wherein the trigger condition corresponds to a selected one of the one or more operational modes.

16. The method of claim 10, further comprising:
generating clock signals;
identifying the selected sensor based on a low signal or a high signal received over at least one chip select pin;
transmitting data to and/or receive data from the selected sensor; and
transmitting the clock signals to the selected sensor,
wherein the maintaining active the single communication session with the selected sensor over the at least one pin comprises maintaining the at least one chip select pin at an active level.

17. The method of claim 16, further comprising:
comparing a wait interval to the clock signals, wherein the detection of the trigger condition comprises detecting an expiration of the wait interval based on the comparing.

18. An apparatus for transferring data between a microprocessor and one or more sensors, the apparatus comprising:
means for retrieving, from a sensor register, a value identifying which of the one or more sensors is a selected sensor for communication over at least one pin, the at least one pin being operably coupled to the microprocessor and the one or more sensors;
means for generating a read command based on the sensor register, and transmitting the read command to the selected sensor;
means for detecting a trigger condition;
means for, upon detecting the trigger condition, receiving, from the selected sensor, a predetermined number of sensor values, wherein the predetermined number of the sensor values is received while maintaining active a single communication session with the selected sensor; and
means for transmitting processed data to an on-chip memory, the processed data being generated based at least in part on the sensor values, wherein the on-chip memory is accessible by the microprocessor.

19. A method for transferring data between a microprocessor and one or more sensors, the method comprising:
retrieving, from a sensor register, a value identifying which of the one or more sensors is a selected sensor for communication over at least one pin, the at least one pin being operably coupled to the microprocessor and the one or more sensors;
generating a read command based on the sensor register and transmitting the read command to the selected sensor;
upon detection of a trigger condition, receiving, from the selected sensor, a predetermined number of sensor values, wherein the predetermined number of the sensor values is received while maintaining active a single communication session with the selected sensor over the at least one pin;
generating clock signals;
identifying the selected sensor based on a low signal or a high signal received over at least one chip select pin, wherein the maintaining active the single communication session with the selected sensor over the at least one pin comprises maintaining the at least one chip select pin at an active level;
transmitting data to and/or receive data from the selected sensor;
transmitting the clock signals to the selected sensor; and
comparing a wait interval to the clock signals, wherein the detection of the trigger condition comprises detecting an expiration of the wait interval based on the comparing.

20. The method according to claim 19, further comprising:
transmitting processed data to an on-chip memory, the processed data being generated based at least in part on the sensor values, wherein the on-chip memory is accessible by the microprocessor.

* * * * *